US009800525B1

(12) United States Patent
Lerner et al.

(10) Patent No.: US 9,800,525 B1
(45) Date of Patent: Oct. 24, 2017

(54) PROFILE-BASED INTEGRATED MESSAGING PLATFORM

(71) Applicant: Amazon Technologies, Inc., Reno, NV (US)

(72) Inventors: David Mayr Lerner, Seattle, WA (US); Sunil Kumar Garg, Seattle, WA (US); Michael John Kobit, Seattle, WA (US); Eli Hoku Robinson, Mukilteo, WA (US); Erik Joseph Miller, Seattle, WA (US); Brandon John Smith, Seattle, WA (US); Max Slade, Vashon, WA (US)

(73) Assignee: Amazon Technologies, Inc., Seattle, WA (US)

( * ) Notice: Subject to any disclaimer, the term of this patent is extended or adjusted under 35 U.S.C. 154(b) by 211 days.

(21) Appl. No.: 14/037,132

(22) Filed: Sep. 25, 2013

(51) Int. Cl.
  *G06F 15/16* (2006.01)
  *H04L 12/58* (2006.01)

(52) U.S. Cl.
  CPC .................................. *H04L 51/00* (2013.01)

(58) Field of Classification Search
  CPC ...... G06Q 10/107; H04L 15/585; H04L 12/58
  USPC ......................................................... 709/206
  See application file for complete search history.

(56) References Cited

U.S. PATENT DOCUMENTS

| 2008/0020803 | A1* | 1/2008 | Rios ...................... H04M 1/667 455/565 |
| 2011/0153805 | A1* | 6/2011 | Beninghaus ......... H04B 17/309 709/224 |
| 2011/0179126 | A1* | 7/2011 | Wetherell ................ H04L 51/36 709/206 |
| 2013/0339464 | A1* | 12/2013 | Goudarzi et al. ............. 709/206 |
| 2014/0074952 | A1* | 3/2014 | White et al. .................. 709/206 |
| 2014/0149521 | A1* | 5/2014 | Broz et al. .................... 709/206 |

* cited by examiner

Primary Examiner — Alan S Chou
(74) Attorney, Agent, or Firm — Lee & Hayes, PLLC

(57) ABSTRACT

Some examples enable profile-based management of multiple communication channels and associated communication services on an electronic device. For example, role-based profiles may be used to manage and filter communications from various contacts. A profile may be set on the electronic device, such as in response to a user input, or automatically based on a determined context of the electronic device. For instance, the context may be determined from one or more of a physical location of the electronic device, a time of day, a day of the week, or a detected activity of the user. Further, some examples include a unified communication interface that may enable a user to select a contact to receive a communication, and the electronic device may select a communication channel for communicating with the selected contact based at least in part on the profile currently set for the electronic device.

17 Claims, 11 Drawing Sheets

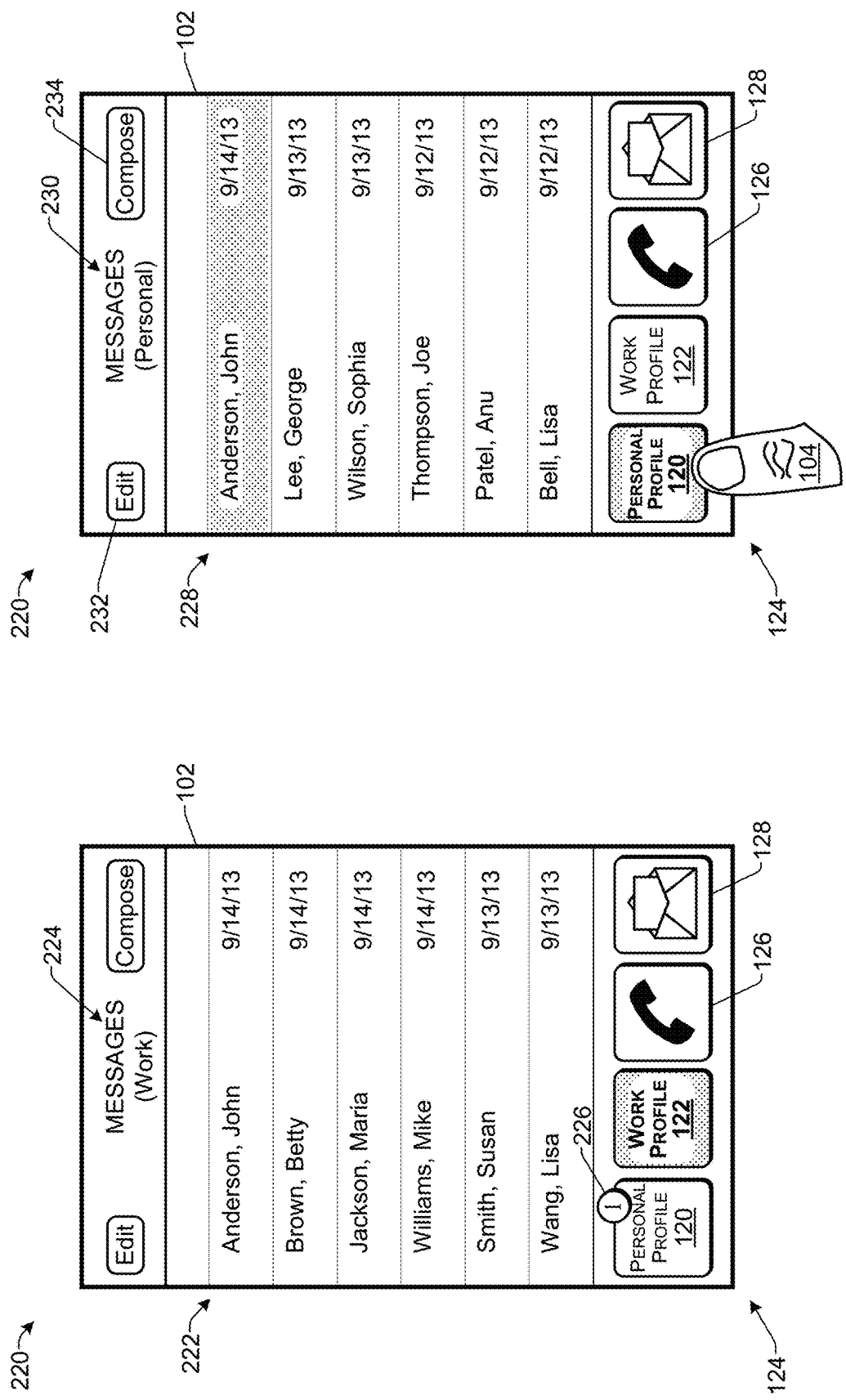

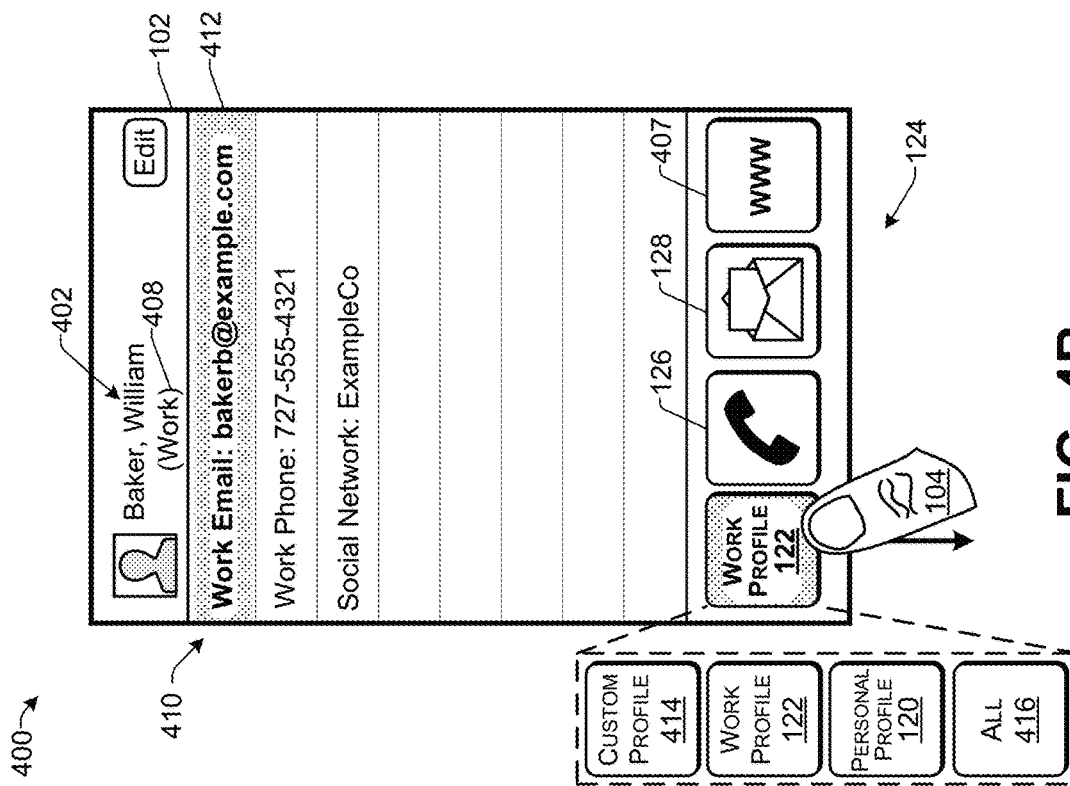
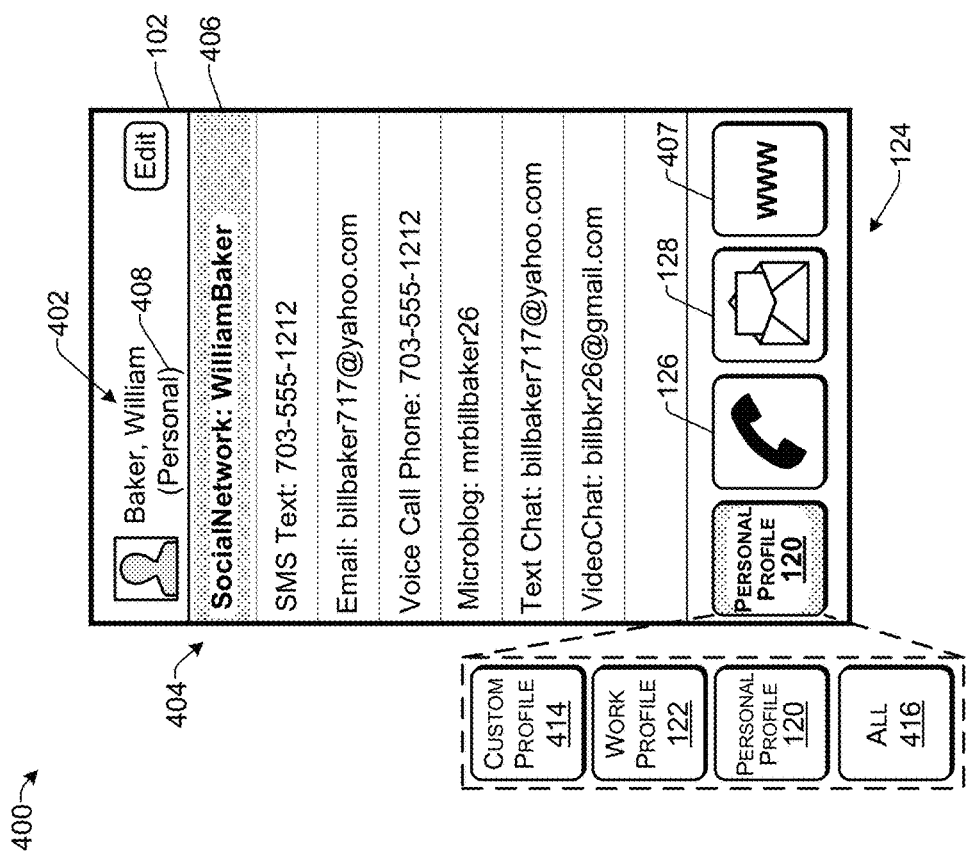
FIG. 4A
FIG. 4B

| | UNIFIED COMMUNICATION INTERFACE (Personal)—508 | |
|---|---|---|
| | New Communication - Preferred communication channel: Text Messg —514 | 515 Select Other |
| Unified Inbox | To: Johnson, Julie | Cc: Bcc: |
| Emails | Subject: Home gardening tips | |
| Text Messages | Hi Julie, | |
| Chat Requests | I just wanted to touch base with you ... | |
| Social Network | | |
| Social Microblog | | |
| Voicemails | | |
| Missed Calls | ☐ Baker, William      Email              Plans for this Friday Night | |
| Unified Sent Communications | ☐ Smith, John           Social Network   Check this out... | |
| Emails | ☐ Wilson, Mary        Text Message     What's new with you? | |
| Text Messages | ☐ Hernandez, Dan    Email              Hey, let me know when your flight is... | |
| Chat Requests | ☐ Miller, Maria         Voicemail         Thursday, August 23 @ 6:17 pm | |
| Social Network | ☐ Davis, Lisa           Social Microblog Who would have thought that this... | |
| Social Microblog | ☐ Jackson, Liz          Email              Plans for this Friday Night | |
| ... | | |

PROFILE-BASED INTEGRATED MESSAGING PLATFORM

BACKGROUND

People use electronic devices for a variety of purposes, such as making telephone calls, texting, accessing the Internet, sending and receiving email, instant messaging, maintaining their calendars, viewing movies and television shows, playing music, reading electronic books, socializing, playing games, navigation, and numerous other functions. Further, people may use the same device for multiple roles in their life, such as for both personal and business purposes. Keeping communications associated with different roles of a person's life separate on an electronic device can require significant effort from a user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2A-2D illustrate example interfaces for switching between profile roles according to some implementations.

FIGS. 4A and 4B illustrate an example interface with profile-based communication channel management according to some implementations.

FIG. 5 illustrates an example unified communication interface according to some implementations.

DETAILED DESCRIPTION

Figure 1:
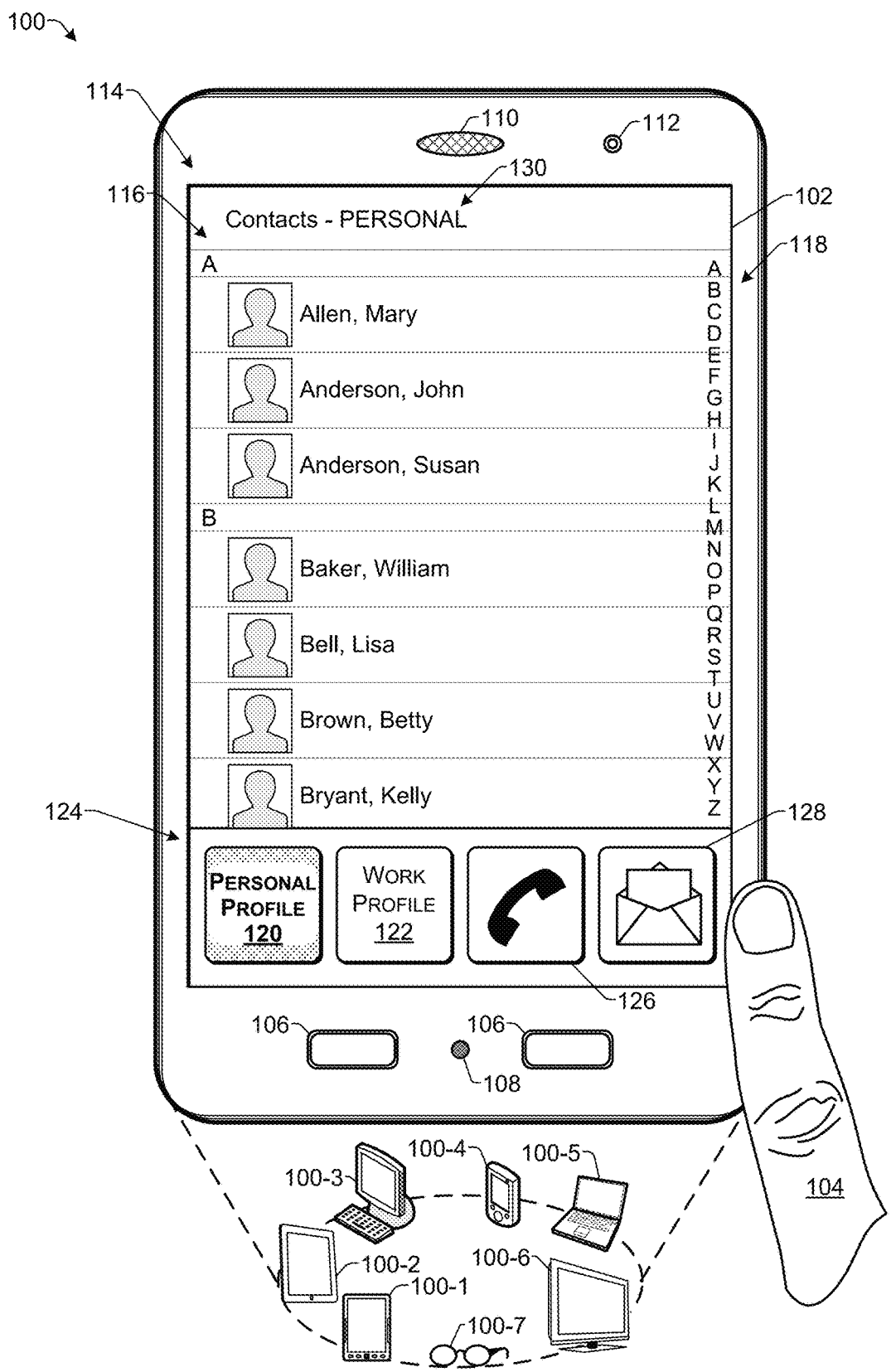
FIG. 1 illustrates an example electronic device having a profile-based interface according to some implementations.

Some implementations herein include techniques and arrangements for profile-based management of multiple channels of communication and associated services on an electronic device. Examples of types of such communication channels may include: personal or web-based emails (e.g., Yahoo!® mail, Gmail®); personal calendars (e.g., iCal®); work emails; work calendars (e.g., Outlook®); work ticketing systems; online text or voice chat systems (e.g., Apple Messages; Google Talk®); video chat systems (e.g., Skype®, Facetime™); social networking accounts (e.g., Facebook®); social microblogs (e.g., Twitter®); personal telephone numbers; personal voicemails; work phone numbers; work voicemails; SMS (short message service) messaging or other types of text messaging; MMS (multimedia messaging service) messaging; and so forth. Some implementations herein tie together some or all of these varied types of communication channels to mange communications for individual contacts according to a respective communication channel appropriate for a current profile of the electronic device.

In some examples, role-based profiles may be used to manage and filter communications. For instance, if a user is looking at a message inbox, the user may only want to view messages from one of a work role or a personal role, and may prefer not to mix together messages or contacts from both personal life and work life. Accordingly, for various different communication channels and the corresponding communication services, a user can switch profiles to filter communications, listings of communications, listings of contacts, available communication channels, and so forth. Additionally, when a first profile has been applied to the electronic device, a feature may be provided to notify the user of pending interactions or communications corresponding to one or more other profiles on the electronic device. As one example, small badges, icons, or other notifiers may be displayed at a suitable location to inform the user of the pending interactions or communications so that new information in the one or more other profiles is not missed when a particular profile is active. In addition, the user interface may include a "view all" option that can be selected to combine the separate profile settings, such as for a particular communication channel, to enable the user to see all communications and interactions together.

The user of the electronic device may create a profile on the electronic device to map services and corresponding communication channels to a role or activity on a per-contact basis. For example, some communication services for a contact may be mapped as "personal" services and other communication services for the contact may be mapped as "work" services. Further, if an individual has a side job, hobby, or other activity, such as deacon in a church, the user can create a custom profile for this activity as well. There can be a many to many relationship between profiles and services. For example, communication services may not be limited to use with one profile, but may switch from use with one profile to use with another profile, such as in response to a user input, a detected change in context of the user, or the like.

As one example, suppose that an electronic device is set in the personal profile mode, and the user is using a video chat service, such as Skype®, to video chat with a friend. When the user accesses the available contacts, only the contacts that are personal contacts might be shown to the user. Further, suppose that the user would like to video chat with a colleague from work. The user may tap or swipe to a "work" icon to switch the electronic device from the personal profile mode to the work profile mode, and the list of contact identifiers shown for the video chat service may automatically switch from those of personal contacts to those of work contacts, so that personal contacts are no longer shown and only work contacts are shown. Further, a listing of past conversations made using the video chat service may switch from personal conversations to work conversations, i.e., only those conversations held with work contacts are shown and conversations previously held with personal contacts will not be shown. Other services may respond similarly when the electronic device switches between the personal profile and the work profile.

In some cases, a user interface may be displayed to enable a user to switch manually between different profile modes. For instance, a focus area of the electronic device, such as the bottom portion of a smart phone screen, may provide a location where the user can manually choose a current profile mode, such as by swiping or sliding icons, tapping icons, or the like. Thus, the user may easily transition between profiles to switch automatically between work communication channels and personal communication channels that may be associated with the user's contacts. Further, while a user input is described as one technique for switching between the personal profile and the work profile, in some cases, the electronic device may switch automatically between profiles based on a detected context of the user or the electronic device, such as a location of the electronic device, time of day, a current detected activity of the user, or the like, as discussed additionally below.

Some implementations herein may include assigning some or all communication channels for a given contact into one of the profiles of the electronic device. For example, suppose that a first user has contact information that includes a work email as a work communication channel and a social network page as a personal communication channel, and the first user sends the contact information with both the work email and the social network page to an electronic device of a second user. The electronic device of the second user may associate the work email with a work profile of the second user and may associate the social network page with a personal profile of the second user. Accordingly, the contact information for the first user is included in both the work profile of the second user and the personal profile of the second user, but the different specified communication channels help to ensure that work related communications are maintained separate from personal communications. Consequently, the predefined default profile roles (e.g., personal and work) can be used to manage each communication service for directing communications through the proper communication channel for a current context.

Some implementations may enable profile-based locking and/or encryption. For example, special access controls may be placed on a particular profile, such as the work profile, and not on another profile, such as the personal profile. Consequently, all data and communications corresponding to the work profile may be subject to the password and/or encryption rules, while the data and communications corresponding to the personal profile are not. For instance, when the user switches from the personal profile mode to the work profile mode, the user may be requested to enter a passcode or other authorization information to complete the transition to the work profile mode. Thus, contacts, data and applications that are identified as corresponding to the work profile may become accessible only after the user enters the correct passcode. This way, access to work contacts, work-related applications, work-related data, and work-related communications can include an added layer of protection from unauthorized access.

Further, during contact information exchange, when a first user gives contact information to a second user, the first user can send contact information for a single communication service, an entire profile of services (e.g., just work contact information or just personal contact information), or all contact information (i.e., contact information for multiple profiles, with identification of which communication services correspond to which of the different profiles). In sending the contact information, such as via an electronic contact card, to the second user (e.g., through any communication channel), the communication channel profile information may be sent as well to assist the electronic device of the second user in correctly placing the first user's contact information into the second user's device for the proper profile. As one example, if the first user's electronic device is in the personal profile mode when the contact information is sent, then just the communication channel contact information designated for personal use is sent to the second user, and if the first user's electronic device is in the work profile mode, then just the communication contact channel information for work use is provided to the second user. This default functionality may be overridden manually by the user, such as for sending both work-related communication channel information and personal communication channel information.

Some examples may enable shared custom profiles for various activities, interests, or the like, and these custom profiles may be cloud synchronized. As one example, a user can create a custom profile such as "Book Club" and can invite other users to join and share that profile. All people who join this shared profile may have the contact information that they want to use for that profile auto-synched with everyone else sharing the profile. For instance, the person that creates the shared profile may be the owner, and the owner may control the addition and removal of other individuals. Removal of a particular user from the shared profile may remove all contacts for the shared profile from the electronic device of the particular user. Further, ownership can be transferrable. As one example, a shared profile may be associated with a voice service to enable creation of a push-to-talk-over-IP service for the group of users that share the profile.

Some implementations may include context-based profile switching. For example, when a user physically arrives at work, the user's electronic device can automatically switch from a personal profile mode to a work profile mode. Sensors on the electronic device (e.g., a global positioning system (GPS) device) or other position information, such as may be received from a service provider (e.g., cell tower proximity information) may be used to determine a current location of the electronic device and may cause the electronic device to switch to a work profile mode when the electronic device is brought within a threshold distance of a designated work location. Similarly, time of day, day of the week, date of the year, etc., may also be used, at least in part, for determining a current context of the electronic device. Further, in some cases, a detected activity of the user may be used, at least in part, to determine a current context of the electronic device.

In addition, each profile may define one or more preferred communication channels for individual contacts. For example, out of multiple available communication channels, a contact may have a preferred communication channel for personal communications and a different preferred communication channel for work communications if the contact is both a work contact and a personal contact. These preferred communication channels may be specified by the contact when the contact information is provided. Alternatively, a preferred communication channel may be inferred based on a frequency with which communications are received from the contact, or sent to the contact, through individual ones of the possible communication channels. For example, if observation of past communications show that a particular contact has most frequently used a social network to contact the user of the electronic device, then the electronic device may designate the social network communication channel as the preferred communication channel, and may automatically select this channel for communication when the user of the electronic device wants to send a communication to the contact. In addition, if a particular communication channel is not currently available, or if a communication attempt on the preferred channel is detected to have failed, the electronic device may intelligently fail over to one or more defined fallback channels that may be included for each contact in a profile.

Additionally, in some cases, contact information from some or all of the communication services available on an electronic device may be unified into a single message composition interface. Further, notifications of received communications from some or all of the communication services may also be unified into the same interface. Thus, a user may not need to be concerned with which communication service is used to send a communication, but can merely select the contact and provide the content of the message. The electronic device may automatically select one or more appropriate or preferred communication channels for sending the communication, such as by taking into consideration a current context. Further, if the user wants to select a particular communication channel for a particular message, the user may perform a user interface action, such as holding a finger (e.g., a long touch) over the selected communication channel to pull up a dropdown menu of other available communication channels for the contact. The user may then choose a particular communication channel from the dropdown menu of available communication services.

For discussion purposes, some example implementations are described in the environment of profile-based communication management on an electronic device. However, the implementations herein are not limited to the particular examples provided, and may be extended to other types of interface configurations, other types of communication services, and other types of devices, as will be apparent to those of skill in the art in light of the disclosure herein.

FIG. 1 illustrates an example electronic device 100 that includes profile-based management of communications according to some implementations. The electronic device 100 may be implemented as any of a number of different types of electronic devices. Some examples of the electronic device 100 may include digital media devices and electronic book (eBook) readers 100-1; tablet computing devices 100-2; desktop, terminal and workstation computing devices 100-3; smart phones and mobile devices 100-4; laptop and netbook computing devices 100-5; televisions, gaming systems, home electronic devices, and automotive electronic devices 100-6; augmented reality devices, helmets, goggles or glasses 100-7; and any other device capable of sending or receiving communications according to the techniques described herein.

The electronic device 100 may include, or may have associated therewith, a display 102 to present information to a user. In some types of electronic devices 100, the display 102 may be a touch-sensitive display configured with a touch sensor to sense a touch input received from an input effecter 104, such as a finger of a user, a stylus, or the like. Thus, the touch-sensitive display may receive one or more touch inputs, stylus inputs, selections of icons, selections of text, selections of interface components, and so forth.

In other types of electronic devices 100, the display 102 may be non-touch sensitive. Accordingly, in addition to, or as an alternative to, a touch sensitive display, the electronic device 100 may include various external controls, buttons, or input devices 106. For example, some implementations (not shown in FIG. 1) of the electronic device 100 may include a virtual or physical keyboard or keypad, a mouse, a pointing stick, a touchpad, a trackball, a joystick, a remote control, and/or various other controls for performing various desired inputs and interactions with the electronic device 100, such as with an interface or other information presented on the display 102. Additionally, in some implementations, one or more voice commands may be used to control or interact with the interfaces and electronic devices herein. Further, in some examples, a user's eye position or point of focus may be detected to serve as inputs or commands. Thus, implementations herein are not limited to any type of input devices, techniques, or controls. In the illustrated example, the electronic device 100 includes various other components, such as one or more microphones 108, one or more speakers 110, and one or more cameras 112.

In this example, the display 102 may present a user interface 114 that includes a plurality of contacts 116 and a directory 118. Each contact 116 may identify a person or an entity, and may have at least one communication channel associated therewith to enable the user of the electronic device to communicate with the contact. Examples of communication channels for a contact may include a telephone number for calling the contact, an email address for sending an email to the contact; a text message number or identifier for sending a text message to the contact; a text chat identifier, such as for communicating with the contact via an instant messaging service; a video chat identifier, such as for communicating with the contact via a video chat service; a social network account identifier for communicating with the contact through the social network; or a microblog account identifier for communicating with the contact through a microblog service. Thus, an example of a type of communication channel may be personal email, while a corresponding example of a communication channel for a particular contact is the particular contact's email address. In addition, a contact may have multiple communication channels of the same type, e.g., a first personal email address and a second personal email address. Thus, in some examples, a preferred order of communication channels may be established or determined for contacts having more than one communication channel associated with a profile.

As an example, suppose that the user has accessed an application or communication service that includes a listing of contacts 116. The communication channels associated with each contact 116 may be associated with at least one profile on the electronic device 100. For example, based on the profile associations of the communication channels, some of the contacts 116 may be associated solely with a personal profile, others of the contacts may be associated solely with a work profile, and still others of the contacts 116 may be associated with both the personal profile and the work profile. In the case that a contact is associated with only one profile, all the communication channels for that contact may be tagged or otherwise associated with that one profile when the contact's information is added to the electronic device. Alternatively, vice versa, if all the communication channels for a particular contact have been tagged or otherwise associated with one profile, that contact is associated with that profile by default. As another alternative, for a contact that is associated with more than one profile, some of the communication channels for that contact are associated with a first one of the profiles, and others of the communication channels are associated with a second one of the profiles, which results in the contact being associated with both the first and second profiles. Thus, the profile associations of the communication channels for each contact may determine with which profile(s) that contact is associated. In the examples herein, a tag may include any label, identifier, binary flag, text string or other information indicating that a communication channel may be associated with a particular profile. A tag may be added by a contact to the contact's own contact information, such as prior to sending the contact information; may be added automatically by the contact's own electronic device, such as based on a context under which the contact information is communicated; may be added by a user of an electronic device that receives the contact information; or may be added automatically by the receiving electronic device, such as based on a context determined for a received communication, based on an association of the contact with various other contacts, and so forth, as discussed additionally below.

Furthermore, the user interface 114 may enable a user to select manually between multiple profiles such as between the personal profile and the work profile. The illustrated example includes a personal profile button or icon 120 and a work profile button or icon 122, which may be selected to enter the electronic device 102 into either the personal profile mode or the work profile mode, respectively. Further, while two profile icons 120 and 122 are shown in this example, in other examples additional profile icons may be displayed or may be able to be displayed. Examples of such additional profile icons include a custom profile icon selectable for switching to a custom profile, such as corresponding to a particular activity, and an "all" icon selectable for enabling display of all contacts regardless of the profile with which they are associated.

As one example, suppose that the personal profile mode is currently in effect on the electronic device 100, as shown by the highlighting of the personal profile icon 120. Further, suppose that the user has accessed the contacts 116 available on the electronic device 100 using a contacts application or utility. Because the personal profile mode is currently selected, only those contacts that are associated with the personal profile are shown in the user interface 114. Should the user desire to select a contact that is associated with the work profile, the user can tap on the work icon 122 and the contacts 116 associated with the personal profile are replaced with a listing of contacts 116 that are associated with the work profile of the user. Thus, the work profile contacts may be displayed without the user having to close and reopen the listing of contacts 116. In some cases, one or more of the contacts 116 may be associated with both the personal profile and the work profile of the user, and those one or more contacts will be displayed in contact listings for both the personal profile and the work profile. Accordingly, the interface 114 enables a user to quickly transition between contacts associated with different profiles without having to close the current contact list interface and manually access a different contact list.

As an alternative to omitting the contacts of the other profiles entirely from the listing of contacts 116, the contacts 116 associated with the other non-selected profiles may instead be displayed, but may be visually deemphasized, such as by being shown in smaller text, lighter text, or the like, while the contacts associated with the selected profile may be shown in larger text, darker text, or the like. This may aid the user in locating a contact for which the user is unsure of the profile with which the contact is associated.

Further, the focus area 124 of the interface 114 may include other conventional types of icons such as a phone icon 126 selectable for making a telephone call, and an email icon 128, selectable for checking email. In addition, while the two profile icons 120 and 122 are shown as both being present in a focus area 124 of the electronic device 100, in other examples, only one of the icons 120 or 122 may be displayed at any one time to indicate the current profile mode of the electronic device 100. The user may manually switch from one profile mode to another by swiping the visible profile icon 120 or 122 up or down, left or right, etc., to place the other profile icon 120 or 122 into the focus area 124. This configuration provides room for at least one additional conventional icon in the focus area 124. Further, the listing of contacts 116 may include one or more labels 130, such as at the top of the listing or adjacent to each contact to indicate that the contacts are personal contacts, rather than work contacts, and as discussed below, will be communicated with via a communication channel appropriate for personal contacts rather than work contacts.

In some examples, one or more modules of an operating system of the electronic device 100 may generate the interface 114 and may manage the profiles and the associated information. As several examples, the interface 114 and any associated graphic effects, may be generated using any of HTML (hypertext markup language), JavaScript®, CSS (Cascading Style Sheets), widgets, C, C+, Java®, any combination thereof, or any other suitable technology, programming language, or graphics rendering software. Further, one or more application programming interfaces (APIs) may be employed by the operating system to enable interaction with communication service applications from third parties that are installed on the electronic device 100. For example, the operating system may inform the communication services on the electronic device 100 of the current profile mode of the electronic device 100 such as when a communication service is opened or accessed, or when the profile mode of the electronic device is changed. As one example, a software development kit may be provided to developers of communication service applications to ensure that their applications are able to operate as described herein.

In some implementations, the operating system of the electronic device 100 may include one or more modules that run as background processes to monitor the current context of the electronic device 100. For instance, the context of the electronic device 100 may be monitored such as by detecting the time of day, day of the week, the location where the electronic device 100 is physically located, one or more applications currently executing on the electronic device 100, whether the electronic device 100 is in motion, or by otherwise detecting a current use or context of the electronic device 100, such as based on inputs received from one or more sensors, input devices, or information from other sources. When the electronic device 100 detects a change in context, the electronic device 100 may transition the electronic device 100 to the profile mode appropriate for the new context.

As one example, the profile may be set on the electronic device 100 according to a location specified by the user, or according to a location determined by the electronic device 100. For example, the user may set the electronic device 100 to switch to a work profile according to a location of the electronic device 100, such as when the electronic device is within a certain proximity or vicinity of the user's office or place of employment. In some cases, the electronic device 100 may automatically determine the physical location of the electronic device 100 and switch profile modes according to the determined physical location. In other examples, the user may use touch inputs, voice commands or other user inputs to instruct the electronic device 100 to enter a particular profile mode. For instance, the electronic device 100 may determine that the user has arrived at work, and may automatically switch the electronic device 100 from the personal profile mode to the work profile mode. Further, the electronic device 100 may change the highlighting of the icons 120 and 122, so that the work profile icon 122 is highlighted and the personal profile icon 120 is no longer highlighted, which indicates to the user that the electronic device 100 is currently set in the work profile mode. When the user goes to use the electronic device 100, the electronic device 100 opens in the work profile mode, and if the user desires to switch to the personal profile mode, the user may manually switch, such as by selecting the personal profile icon 120, swiping to the personal profile icon 120, or the like.

In addition, the electronic device 100 may switch between profiles according to time, such as morning, afternoon, evening, weekend, and so forth. For example, between 8:00 am and 5:00 pm on weekdays, the electronic device may automatically place itself into the work profile mode. In some examples, the electronic device 100 may consider all of the location, time of day, day of the week, date of the year, etc., when determining a current context of the device and which profile to choose. For example, for certain types of jobs, the electronic device may be set to enter the work mode anytime the electronic device 100 is at the user's place of employment, or at certain times even if the electronic device 100 is not that the user's place of employment.

In addition, sensors on the electronic device 100 may be used to determine a current activity of a user, which may also be indicative of a particular context of the user and the electronic device 100. For example, the user may be a member of a running club, and may have a custom profile for the running club. When a combination of sensor inputs, such as accelerometer inputs, GPS device inputs, etc., indicate that the user is running, the electronic device 100 may switch to the custom profile. Further, after the sensors indicate that the user has ceased running for a threshold period of time, the electronic device may switch to a different profile mode, such as the work profile or the personal profile, depending on the appropriate context, such as based on time of day and/or location of the electronic device.

Figures 2A, 2B:
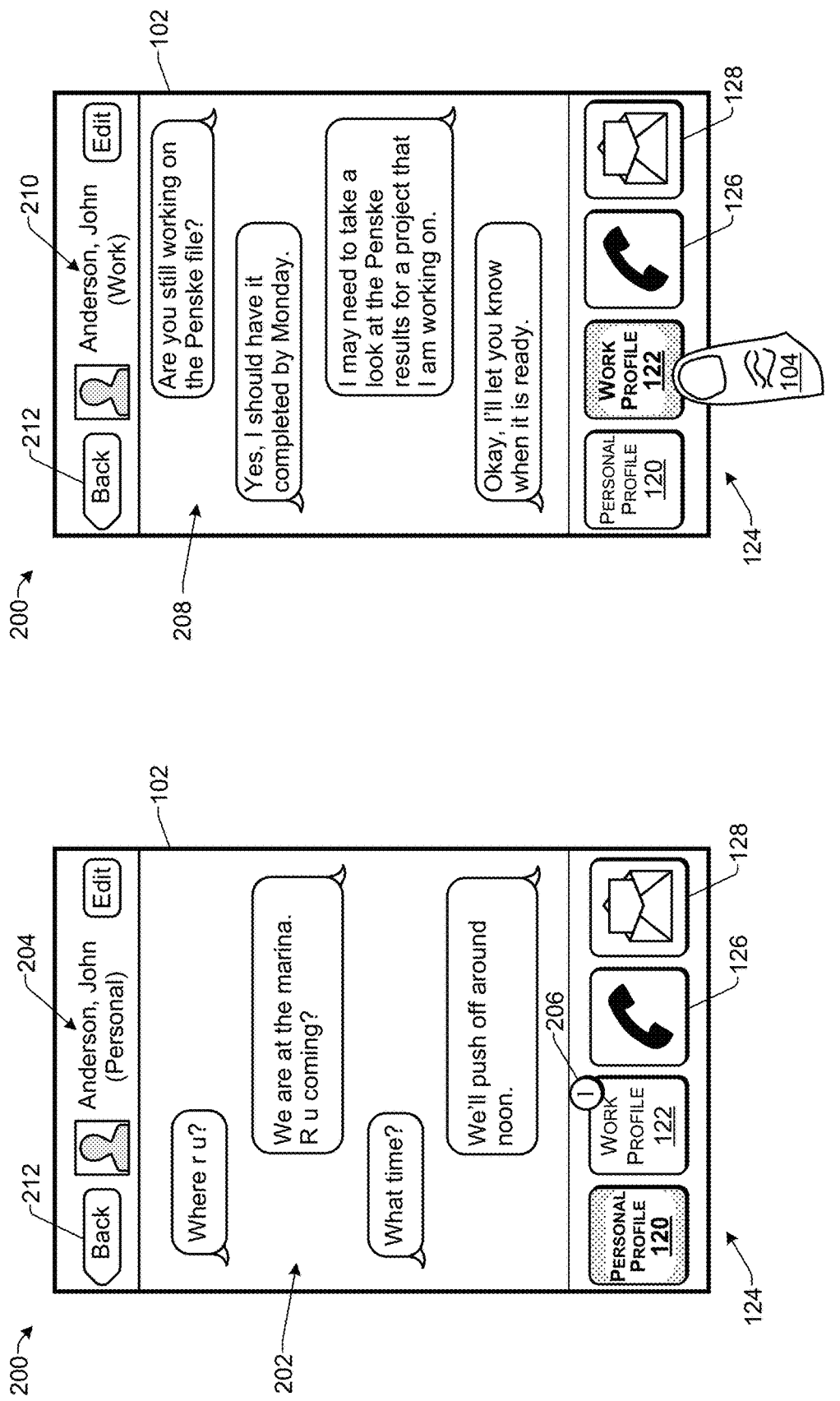

FIGS. 2A-2D illustrate example interfaces 200 and 220 able to switch between profile modes according to some implementations. The example of FIG. 2A illustrates a first text message or instant messaging conversation 202. For instance, the user of the electronic device 100 may be carrying on a text conversation with a contact, John Anderson, as identified at 204, who is both a work contact and a personal contact. In FIG. 2A, the electronic device is in the personal profile mode, as indicated by the visually emphasized state of the personal profile icon 120. When one of the profiles is in effect, communications associated with a different profile may not be presented, may be deferred, sent to voicemail, or the like. For instance, when the electronic device 100 is in the personal profile mode, work-related phone calls may go directly to voicemail, work-related text messages may not be displayed in a list of messages until the work profile mode goes into effect, and so forth. Further, certain contacts (e.g., spouse, child) may be given special status such that their communications are passed through regardless of the current profile mode. Alternatively, there may be a situation in which special status is applied to not pass through any communications from certain contacts, regardless of the current profile mode.

As mentioned above, the user may be notified of pending interactions or communications for the one or more other profiles. For instance, small badges, icons, or other notifiers 206 may be displayed at a suitable location to inform the user of the pending interactions or communications so that new information in other profiles is not missed when a particular profile is active. In the illustrated example, suppose that the user had recently sent a text message to John Anderson in the work profile to check on the status of a work-related project, and that John Anderson has responded to the text message. Accordingly, the response is not presented in the interface of FIG. 2A, but instead the notifier 206 may be presented in the focus area 124 adjacent to the work profile icon 122. The notifier 206 may further indicate how many pending communications or interactions are currently associated with the work profile 122. In addition, while the notifier 206 is shown in an example location and configuration in FIG. 2A, other locations and configurations may be employed, such as different icon shapes, different graphic effects for indicating the number of communications, different colors, shapes or graphic effects for indicating different profiles have pending communications, and so forth.

As illustrated at FIG. 2B, the user may use a finger or other input effecter 104 to select the work profile icon 122 to switch to the work profile mode. Alternatively, in the implementations where a single profile icon is used, the user may swipe between profile icons, may select a profile mode from a dropdown menu, or the like. Upon selecting the work profile mode, the interface 200 may automatically switch to presentation of a text conversation 208 for the same contact, John Anderson, but in a work-related capacity. Thus, the interface may identify the current contact, John Anderson, as a work-related contact as indicated at 210. The communications in the conversation 208 may have been received from a different communication channel, e.g., a work phone number, or may have been otherwise identified as work-profile related, rather than personal-related, as discussed in the examples herein. For instance, the conversation 208 may have been initiated in the work-profile mode, and this work-profile association may be maintained throughout the course of the conversation 208, while the conversation 202 may have been initiated in the personal profile mode, and this personal-profile association may be maintained for the conversation 202. Further, in the case that the recent work-related communication corresponding to the notifier 206 was a message received from John Anderson, the notifier 206 may no longer be displayed to indicate that there are no additional work-related communications or interactions awaiting the user's attention. Alternatively, if John Anderson were only a personal contact, and not also a work contact, then, when the user selects the work profile 122, the user may be presented with a list of work conversations that have take place with other contacts, rather than the conversation 208 corresponding to John Anderson.

In some cases, after viewing the most recently received text message in the text conversation 208, the user may select the personal profile icon 120 to transition back to the personal profile mode, such as for again viewing the personal conversation 202 with John Anderson as a personal contact. Accordingly, implementations herein are able to seamlessly transition between personal profile contacts and work profile contacts without leaving a currently open communication service.

As an alternative example, suppose that in FIG. 2B, the user selects the "back" icon 212 to view a list of all recent work-related text conversations. FIG. 2C illustrates an example interface 220 that may be presented in response that includes a list 222 of the recent text conversations that have taken place with work contacts. Accordingly, the list 222 only shows text conversations that have been associated with work contacts. Thus, the list 222 shows the most recent conversation with John Anderson in a work context, as well as recent conversations with other contacts in a work context, and does not show conversations that have taken place in a personal context with any of these contacts or with other personal contacts.

Furthermore, suppose that a notifier 226 is presented in the interface 220, such as while the user is scrolling through the work conversations in the list 222. For instance, the notifier 226 may indicate that a communication associated with the personal profile has been received by the electronic device. As illustrated in FIG. 2D, the user may subsequently select the personal profile icon 120 to transition the device from the work profile mode to the personal profile mode. Thus, switching to the personal profile mode may result in the list 222 of work conversations being replaced by a list 228 of personal conversations, and the interface 220 may indicate at 230 that the messages are now from personal contacts. Further, in some examples, the particular conversation including the most recently received communication may be highlighted in the list 228, i.e., the personal conversation with John Anderson in this example. The user may select this item from the list 228, and may be presented with the interface 200 corresponding to the example of FIG. 2A. Alternatively, the user may select an edit button 232 to edit a conversation or a compose button 234 to compose a new message. Furthermore, in other examples, the communication corresponding to the notifier 226 may have been received through a different communication channel than text messaging. In such a case, the user may access the application for the different communication channel, or may access a unified communication interface, as discussed below with respect to FIG. 5. Numerous other variations will be apparent to those of skill in the art having the benefit of the disclosure herein.

Figure 3:
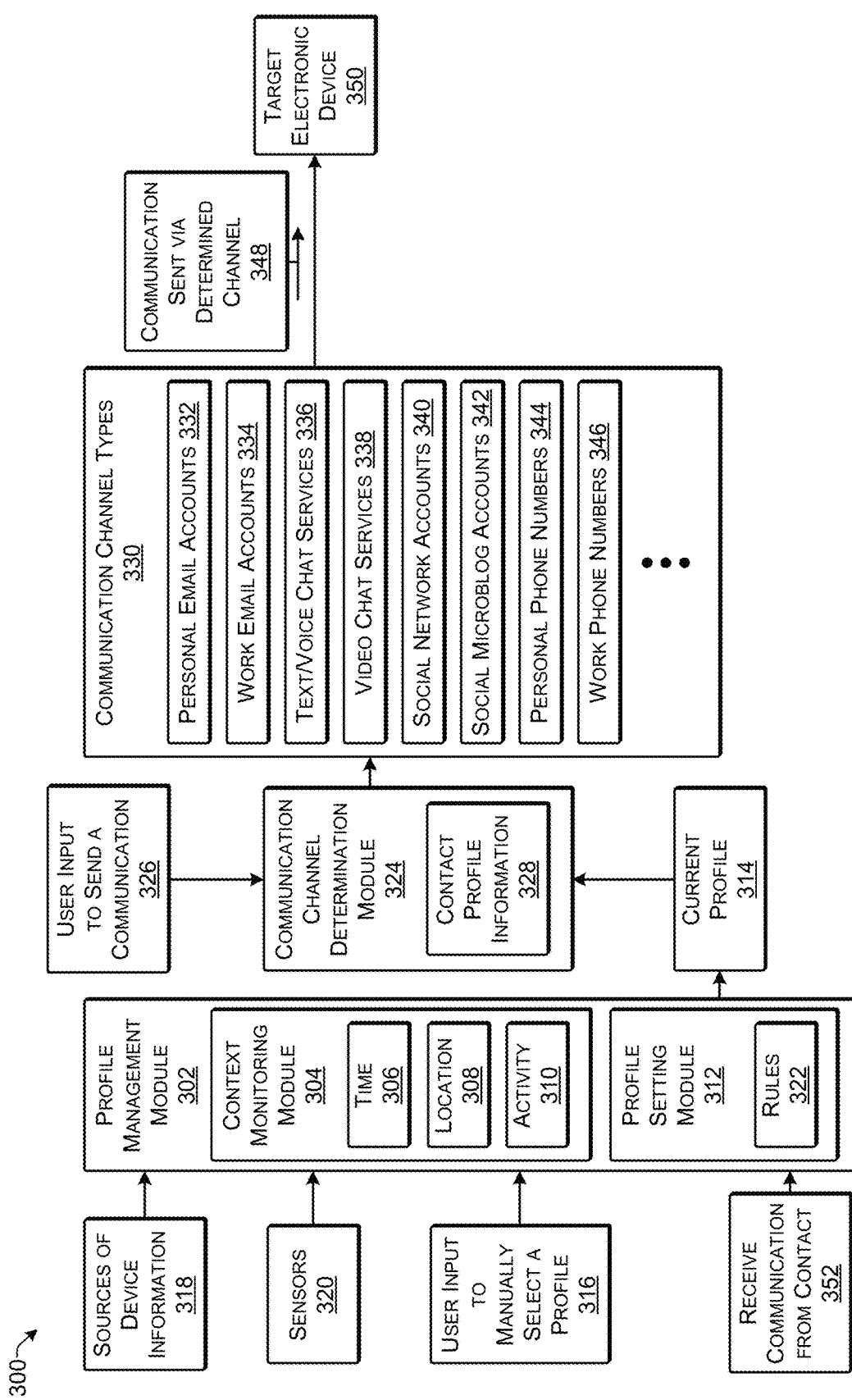
FIG. 3 illustrates an example framework for profile-based communication management according to some implementations.

FIG. 3 illustrates an example framework 300 for using profiles for managing communications on an electronic device according to some implementations. In this example, the electronic device 100 may include a profile management module 302 that may be executed by one or more processors on the electronic device 100 for managing the profiles on the electronic device. The profile management module 302 includes a context monitoring module 304 that can monitor the current context of the electronic device 100, such as based on a current time 306 (e.g., time of day, the a week), a current location 308 of the electronic device 100, and/or a current detected activity 310 of a user of the electronic device 100. The profile management module 302 may further include a profile setting module 312 that sets the current profile 314 of the electronic device in response to either an instruction from the context monitoring module 304 or a user input 316 to manually select a profile. For instance, the profile management module 302 may receive the user input 316 to manually select a particular profile. In such a case, the user input 316 overrides any automatic determination of context by the context monitoring module 304. Consequently, the profile setting module 312 may set the current profile 314, as specified by the user, and the profile management module 302 may wait for a threshold period of user inactivity before resuming automatic context monitoring and profile setting.

During monitoring of the context of the electronic device 100, the context monitoring module 304 may receive context-indicative information from a plurality of sources 318 of device information that may be used to determine a current context of the electronic device 100. Examples of sources 318 of information may include a computer clock, an online time source, or the like, to indicate the time of day, the day of the week, the date, the month, the year, etc. The sources 318 of information may further include current device settings, such as user preferences for when the electronic device 100 can set profiles automatically. Furthermore, the sources 318 of information may identify one or more active applications that are currently active or executing on the electronic device 100, such as being used currently by a user of the electronic device 100, or currently displaying an interface on the display, which may provide an indication of a current use of the electronic device 100 or an activity of the user. For example, a calendar application may provide information regarding whether the context of the electronic device is currently related to work, a particular activity, or the like.

Additionally, the context monitoring module 304 may also, or alternatively, receive context-indicative information from one or more sensors 320 on the electronic device 100. Examples of sensors 320 may include a GPS device, an accelerometer, a compass, a microphone, one or more communication interfaces, one or more cameras and/or a gyroscope. For example, the accelerometer can be monitored in the background to check for motion that is indicative of certain types of activity or movement of the electronic device 100 and the user. Various different types of motion, such as gaits, cadence, rhythmic movements, and the like, can be detected by the accelerometer and may be indicative of walking, jogging, running, and so forth. The compass and gyroscope may further indicate motion based on a change in direction of the electronic device 100. The microphone may detect noises or sounds that may indicate particular locations or activities. The GPS device can identify a location of the electronic device 100, and can detect movement of the electronic device 100 from a first location to a second location. In some cases, a camera may be used to detect a context, such as for determining a location of the electronic device, if permitted by the user. Additionally, communication interfaces can act as sensors to indicate a physical location of the electronic device 100, such as based on identification of a cell tower, a wireless access point, or the like, that is within range of the electronic device 100. Numerous other types of sensors 320 may be used for determining a current context of the electronic device 100, as will be apparent to those of skill in the art in light of the disclosure herein.

The context monitoring module 304 may receive the context-indicative information from the sensors 320 and sources 318 of device information, may determine a current context of the electronic device 100, and may provide the context to the profile setting module 312. The context monitoring module 304 may include various statistical models, classifiers, algorithms, or the like, that receive the context-indicative information, i.e., sensor information from the sensors 320 and device information from the sources 318 of device information (e.g., time information, location information, device settings, active applications, and so forth), and that determine a context, such as a time 306, location 308, activity 310, or combination thereof. For instance, the location determined by the GPS device may be cross-referenced with information obtained through the communication interfaces, such as determining a nearest cell tower, a nearest Wi-Fi access point, or the like, which may be indicative of a current location, such as whether the user is at home, at work, or elsewhere.

The profile setting module 312 may receive the context from the context monitoring module 304, compare the context with one or more rules 322 for selecting a profile from among a plurality of stored profiled, and may apply one or more of the rules 322 to select the current profile 314. As one example, the context monitoring module 304 may identify a location at which the electronic device 100 is currently physically located. For example, suppose that the electronic device is located at the workplace of the user. Based on this information, the profile setting module 312 may set the electronic device to the work profile mode as discussed above. In some examples, the user may be provided control over some or all of the rules 322 to control one or more conditions for setting or switching profiles on the electronic device 100.

In addition, to determining when to utilize a particular profile, one or more of the rules 322 may manage how the electronic device 100 behaves when a particular profile is active. As one example, when the electronic device 100 is set to the work profile mode, communications received from contacts associated with other profiles may be treated differently than communications received from contacts associated with the work profile. For example, telephone calls from personal contacts may be sent directly to voice mail. Text messages from personal contacts may not be displayed with text messages received from work contacts, but instead the user may manually switch to the personal profile mode to view them. Communications from work contacts may be treated similarly when the electronic device is in the personal profile mode or a custom profile mode.

Another rule 322 that may be applied when a particular profile is active is profile-based locking and/or encryption. For example, special access controls may be enforced for a particular profile, such as the work profile, and not for another profile, such as the personal profile. Consequently, all data corresponding to the work profile may be subject to the password and/or encryption rules, while the data corresponding to the personal profile is not. For instance, when the user switches from the personal profile mode to the work profile mode, the user may be requested to enter a passcode, provide a biometric authorization, or the like, to complete the switch to the work profile mode. Thus, contacts, data and applications that are identified as corresponding to the work profile may become accessible only after the user enters the correct passcode or other authorization information. Using the technique, work contacts, work-related applications, work-related data, and work-related communications can include an added layer of protection from unauthorized access.

Further, certain work related applications, such as a work calendar (e.g., Outlook®) may be accessible only in the work profile mode, and certain personal applications, such as games or other entertainment applications, may only be accessible in the personal profile mode. In some examples, the icons for accessing or opening these applications may be not displayed on the electronic device, or may be hidden, when the electronic device is in a different profile mode that is not associated with the particular applications.

In addition, the profile management module 302 may keep track of usage activity that takes place while particular profiles are in effect. For example, the profile management module 302 may track roaming charges, data usage charges, in-application purchases, and the like, that are incurred when either the work profile or the personal profile is in effect. This can enable the user to determine whether incurred expenses are work expenses, personal expenses, expenses related to a custom profile, or the like. In some examples, the usage activity tracking may be based on the communication channels actually used for contacting particular contacts, rather than merely relying on the profile mode currently in effect on the electronic device.

Similarly, some examples may include location-based locking or unlocking. For instance, when the context monitoring module 304 detects that the electronic device 100 is able to communicate with a trusted network or otherwise determines that the electronic device 100 is in a designated location (e.g., based on GPS information), the profile management module 302 may not request a passcode for using a particular profile or for the entire device. However, when the electronic device 100 is in other locations, a passcode or other unlocking information may be required for accessing the particular profile or the entire device. For example, when the user is at work the work profile may be automatically unlocked and no passcode may be required for the work profile, but may be required for the personal profile. Similarly, when the user is at home, the personal profile may be automatically unlocked and no passcode may be required, but a passcode may be required for switching to the work profile. Additionally, when the user is elsewhere, i.e., not at home or not at work, a passcode may be required for the entire device.

Furthermore, in some examples, the profile setting module 312 may automatically change rules 322 or implement new rules 322 based on user actions. For example, if the user has manually overridden a setting on multiple occasions, the profile setting module 312 may identify this as a preferred setting of the user, and may change the corresponding rule 312 to comply with the preferred setting of the user. As one example, if the user regularly switches from the work profile mode to the personal profile mode at a particular location, the profile setting module 312 may implement a new rule 322 to automatically switch from the work profile to the personal profile upon detection that the electronic device is at the particular location. As another example, if a particular communication channel for a particular contact is identified as a preferred communication channel, but the user consistently switches to a different communication channel for contacting the particular contact, the profile setting module 312 may change the preferred communication channel for particular contact to the communication channel most often selected by the user. Numerous other variations will be apparent to those of skill in the art in light of this disclosure.

FIG. 3 further includes a communication channel determining module 324 that may receive a user input 326 to send a communication. For example, the communication channel determination module 324 may refer to contact profile information 328 for determining a communication channel to use for communicating with a selected contact. One or more communication channels of one more communication channel types 330 may be associated with each contact to enable sending communications or otherwise communicating with the contact. Some examples of communication channel types 330 illustrated in FIG. 3 include personal email accounts 332; work email accounts 334; text and/or voice chat services 336; video chat services 338; social network accounts 340; social microblog accounts 342; personal phone numbers 344; and work phone numbers 346. For instance, user input 326 may indicate a contact to which the user desires to send a communication. Each contact may have one or more communication channels of various types associated with the contact, and each communication channel associated with a contact may be tagged or otherwise associated with one of the profiles stored on the electronic device 100. The communication channel determination module 324 may determine a current profile 314 of the electronic device 100, and based on the current profile 314 and the contact profile information 328, may determine a preferred communication channel to be used for sending the communication to the indicated contact.

As mentioned above, each contact may have one or more preferred communication channels for at least one profile on the electronic device 100. For example, out of multiple available communication channels, a contact may have a preferred communication channel for personal communications. Furthermore, if the contact is also a work contact, the contact may have a different preferred communication channel for work communications. These preferred communication channels may be specified by the contact when the contact information is provided to the electronic device. Alternatively, these preferred communication channels can be inferred based on a frequency with which communications are received from the particular contact through individual ones of the possible communication channels. For example, if observation of past communications show that the particular contact has most frequently used SMS (short message service) texting to contact the user of the electronic device 100, then the electronic device 100 may designate the SMS texting communication channel as the preferred communication channel, and may automatically select this communication channel when the user of the electronic device wants to send a communication to the contact.

Using the selected communication channel, the user may generate a communication 348 that is sent via the determined communication channel to a target electronic device 350 of the intended recipient. In addition, if a particular communication channel is not currently available, or if a communication attempt on the preferred communication channel is detected to have failed, the electronic device 100 may intelligently fail over to one or more defined fallback channels that may be provided for the contact.

Furthermore, in some examples, the electronic device 100 may receive a communication 352 from a contact, and may determine how to classify the communication, e.g., personal-profile related, work profile related, etc. For instance, if the sender is both a personal contact and a work contact, the context of the communication may be unclear. In some cases, the communication may be received through a communication channel that the sender has previously indicated to be either work-related or personal related. Accordingly, the communication may be classified according to the previously specified classification of the communication channel. In other cases, such as where the message is sent through a communication channel that has not been previously specified to be work related or personal related, the context monitoring module 304 may examine the content of the communication to determine a context and, thus, whether the communication is work related or personal.

A similar technique may be applied for associating a contact and one or more communication channels with a profile. As one example, suppose that the electronic device receives the communication 352, such as an email, from someone that is not already identified as a contact. The context monitoring module 304 may examine the content of the communication, a time of day the communication was sent/received, a source of the communication (e.g., whether the email domain appears to be a business, a web-based email service, and so forth) to determine a context of the communication 352 as being related to the work profile, the personal profile, or a custom profile. Further, the communication 352 may include contact information including one or more communication channels, such as a return email address, as well as other contact information in the body of the email, e.g., a phone number of the contact, etc. Accordingly, based on the determined context of the communication 352 as being associated with a particular profile, the communication channel determination module 324 may save a new contact on the electronic device and may associate any communication channels identified from the communication 352 with the particular profile and the new contact, thereby also associating the new contact with the particular profile.

FIGS. 4A and 4B illustrate an example interface 400 with profile-based communication channel management according to some implementations. In the example of FIG. 4A, suppose that, while the electronic device 100 is in the personal profile mode, the user of the electronic device 100 selects a particular contact, William Baker 402, to which to send a communication. The user may be presented with a listing 404 of available personal communication channels for William Baker, with a preferred communication channel 406 highlighted or otherwise visually emphasized. Accordingly, the interface 400 indicates the preferred communication channel for sending a personal communication to the contact William Baker 402. In addition, the interface 400 may indicate one or more additional communication channels that may be used for communicating with William Baker in a personal context. Thus, in the example of FIG. 4A, the list 404 includes additional communication channels associated with the personal profile, such as an SMS messaging number, a personal email account, a personal phone number, a microblog account, a text chat account, and a video chat account.

In the example of FIG. 4B, suppose that the user decides that the communication should be sent to William Baker in a work capacity, rather than a personal capacity. Accordingly, the user may use a finger or other input effecter 104 to switch the electronic device 100 to the work profile mode. In the illustrated example, the user may switch to a different profile mode by swiping on the personal profile icon 120 to move between profile icons, such as by swiping up or down to move from displaying the personal profile icon 120 to displaying the work profile icon 122, which results in the electronic device transitioning to the work profile mode. Thus, in this configuration, only a single space is occupied in the focus area 124, which allows additional space for other icons, such as a web browser application icon 407 or other desired icon.

Switching to the work profile mode results in a label 408 underneath the contact name changing from "personal" to "work," and further causes a listing 410 of available work communication channels for William Baker to be displayed in the interface 400, with a preferred communication channel 412 highlighted or otherwise visually emphasized. Thus, the displayed available contact channels are limited to the work contact channels when the electronic device is in the work profile mode and limited to the personal contact channels when the electronic device is in the personal profile mode. Consequently, the user or the electronic device 100 may select one of the displayed communication channels and may use that communication channel to send a communication to the selected contact. Further, in some cases, the order in which the communication channels are listed may establish the preferred priority of communication channels for a particular profile.

In some implementations, the user does not have to switch from personal profile mode to work profile mode when sending the communication to William Baker. Instead, the communication is handled automatically by intelligence on the electronic device 100. For example, as discussed additionally below with respect to FIG. 5, the user may merely select the contact, and the electronic device 100 can determine the context of the communication and select the appropriate communication channel for sending the communication. As one example, the electronic device 100 may determine whether the subject matter of the message is work related or personal, and/or may determine from other considerations, such as a time of day, a location of the electronic device 100, a current activity of the user, or the like, whether the communication is likely to be work-related or personal. For example, if the communication is to be sent at 2:00 pm on a Monday, and the location of the electronic device is at the office, there is higher likelihood that the communication is work related. On the other hand, if the message is to be sent at 7:00 pm on a Saturday night, and the location of the electronic device is at a stadium, there is a higher likelihood that the communication is not work related, but instead is personal. Further, if the communication is to be textual, the subject matter of the text may be analyzed to determine whether the communication is a work-related communication, a personal communication, or related to a custom profile. Accordingly, based at least in part on these considerations, the electronic device 100 may automatically select the communication channel for the communication from the preferred work communication channel, the preferred personal communication channel, or from a preferred custom profile communication channel, and the user may have the opportunity to view the selected communication channel when sending or otherwise making the communication.

In addition, the example of FIGS. 4A and 4B includes a custom profile icon 414, which may correspond to a custom profile, such as for a side job, activity, hobby, or the like of the user of the electronic device 100. For instance, shared custom profiles for various activities, interests, or the like, may be created and these custom profiles may be cloud synchronized, as discussed additionally below. Accordingly, if the user selects the custom profile icon 414, and if William Baker is included in the custom profile, a preferred communication channel for William Baker that is associated with the custom profile will be displayed in the interface 400.

Furthermore, the example of FIGS. 4A and 4B includes an "all" icon 416. For example, if the user were to select the all icon 416, the interface 400 would display all of the communication channels available for communicating with William Baker. In some examples, labels may be listed adjacent to each communication channel indicating whether the communication channel is a personal communication channel, a work communication channel, or a custom profile communication channel, and a preferred communication channel for each profile may be highlighted or otherwise visually emphasized.

Further, as mentioned above, the user may swipe or scroll between the personal profile icon 120, the work profile icon 122, the custom profile icon 414 and the all icon 416, for switching between the various corresponding modes. As one example, the scrolling may be enabled in a continuous or carousel manner in which scrolling in the same direction may continuously scroll through the available icons. Alternatively, the user may scroll up and down between the various icons. Furthermore, in other examples, a drop-down menu or other functionality may be provided (not shown in FIGS. 4A and 4B) when the user selects the currently displayed profile icon to enable the user to select a different profile to be in effect on the electronic device.

FIG. 5 illustrates an example unified communication interface 500 that may be employed for sending and receiving communications according to some implementations. For example, contact information from some or all of the communication services available on an electronic device 100 may be unified into a single interface 500 that may be used to generate messages for one or more of the communication services. Further, notifications of received communications from some or all of the communication services may also be unified into the same unified interface 500. In the example of FIG. 5, the unified communication interface 500 may include a new communication area 502 and a unified inbox area 504.

The new communication area 502 may include a "To:" line 506 that may include a "To:" button to enable selection of one or more contacts to whom the new communication will be sent. For example, selection of the "To:" button may result in display of a listing of available contacts for the current profile mode, such as similar to the listing illustrated in FIG. 1. In addition, a "Cc:" button and a "Bcc:" button may also be provided in some cases to enable selection of contacts for receiving a copy or a blind copy, respectively, of the communication. For example, the user may select one or more contacts corresponding to the current selected profile mode of the electronic device 100. The current profile mode may be indicated by a label 508, which in this example indicates that the electronic device 100 is currently in the personal profile mode. The new message composition area 502 may further include a subject line 510, and a composition area 512 for receiving the actual message. Furthermore, after the contact has been selected at 506, the contact's preferred personal communication channel may be displayed as indicated at 514. As mentioned above, in some examples, the preferred communication channel(s) for a contact may be specified by the contact when the contact's information is provided to the electronic device. Alternatively, a preferred communication channel may be inferred based on a frequency with which communications are received from the contact through individual ones of the available communication channels. As another example, the preferred communication channel for a contact may be inferred from the people in the contact's social network, such as based on shared contacts with the user of the electronic device. For example, if most of the contacts that the user has in common and with the particular contact are work contacts, then the contact may be delegated to the work profile, and a work communication channel may be designated as the preferred communication channel. Alternatively, if most of the contacts that the user has in common with the particular contact are personal contacts, then the contact may be delegated to the personal profile, and a personal communication channel may be designated as the preferred communication channel. As one example, social network information or work network information may be mined to automatically determine this information. In addition, if a particular communication channel is not currently available, or if a communication attempt on the preferred channel is detected to have failed, the electronic device may fail over to one or more defined fallback channels that may be included for each contact in a profile, such as illustrated above with respect to FIGS. 4A and 4B.

In some examples, the user composing the new communication may elect to use a different communication channel. For example, the user may select a "select other" button 515 to change the communication channel indicated at 514, such as by tapping or performing a long touch to cause display of a dropdown menu to view other available communication channels for the particular selected contact, such as in an interface similar to that illustrated in FIG. 4A. In addition, when automatically selecting a communication channel, the unified communication interface 500 may apply a rule of sticky communication in some examples, such that, if the user is responding to a communication, there may be preference given to responding using the same type of communication channel as the original message, assuming the response does not go against expressed preferences of the intended recipient.

Furthermore, when multiple contacts are selected to receive the communication, the communication may be sent over the preferred communication channel for each of the selected contacts, which may not necessarily be the same type of communication channel. For example, one contact may have a preferred communication channel for receiving SMS text messaging and the other may have a preferred communication channel for receiving emails. Thus the single message may be composed in the new message composition area 502 and sent to the multiple contacts, with the message being sent to the first contact over the first contact's preferred communication channel (i.e., text message) and to the second contact over the second contact's preferred communication channel (i.e., email). Thus, a user does not need to be concerned with which communication service is being used to send a communication, but can merely select the contact and provide the content of the message. The electronic device 100 may automatically select one or more appropriate or preferred communication channels for sending the communication.

In addition, the unified inbox 504 may display a listing of messages received from personal contacts. For example, the unified inbox 504 may display the name 516 of the contact from which a communication is received, a communication channel or type of communication 518, and a subject 520 of the communication. Accordingly, various different types of communications may be displayed in the unified inbox area 504. In some examples, selection of a particular one of the communications may cause display of the corresponding message, such as in place of the new communication composition area 502. For instance, the user may send a standard authorization request to a messaging platform provider through an application associated with the messaging platform. As one example, the user may use an authorization technology (e.g., OAuth), which allows the messaging platform provider to "plug in" to a third party messaging system. OAuth is an open standard for authorization that enables clients to access server resources on behalf of a resource owner, such as a different client or an end-user. (The OAuth 1.0 Protocol was published as RFC 5849, an informational Request for Comments, in April 2010.) OAuth may also enable end-users to authorize third-party access to their server resources without sharing their credentials (typically, a username and password pair), using user-agent redirections. In this fashion, the passwords are never stored on the local device. The third party can force reauthorization if security requirements change, and password changes can be seamless as passwords are not required for the messaging to work.

In other examples, rather than displaying the message in the unified communication interface, the selection of a particular one of the communications from the unified inbox 504 may cause a corresponding communication service application to open on the electronic device 100 for displaying the communication in its native application. Furthermore, the unified inbox 504 may enable the user to filter the displayed communications according to the type of communication channel used. For example, the user may be able to select display of the unified inbox at 522, display of just emails at 524, display of just text messages at 526, display of just chat requests at 528, display of just social network communications at 530, display of just social microblogs at 532, display of just voicemails at 534, and display of just missed calls at 536. Similarly, the user may also be able to select display of unified sent communications at 538, display of only sent emails at 540, display of only sent chat requests at 544, display of only sent social network communications at 546, display of only sent social microblog communications at 548, and so forth.

Some examples may include message de-duplication features. As one example, if the same message is sent on multiple communication channels, the receiving electronic device 100 can perform de-duplication on the message so that the message appears only once on the receiving electronic device 100. For instance, suppose that a first user sends a message to a second user, and that the message is sent via SMS text messaging, a social network account, and via an email. When the second user reads the message received using any one of the three communication services, the electronic device 100 may automatically delete the message received through the other two communication services, may automatically mark the message as read on the other two communication services, or the like. As another example, when a user receives multiple messages that are essentially the same from multiple sources, the electronic device may delete or hide the messages that are determined to be essentially the same, and may present just one of the messages to the user. The user may have the option to view the other hidden messages that have been determined to be duplicates of the presented message.

Figure 6:
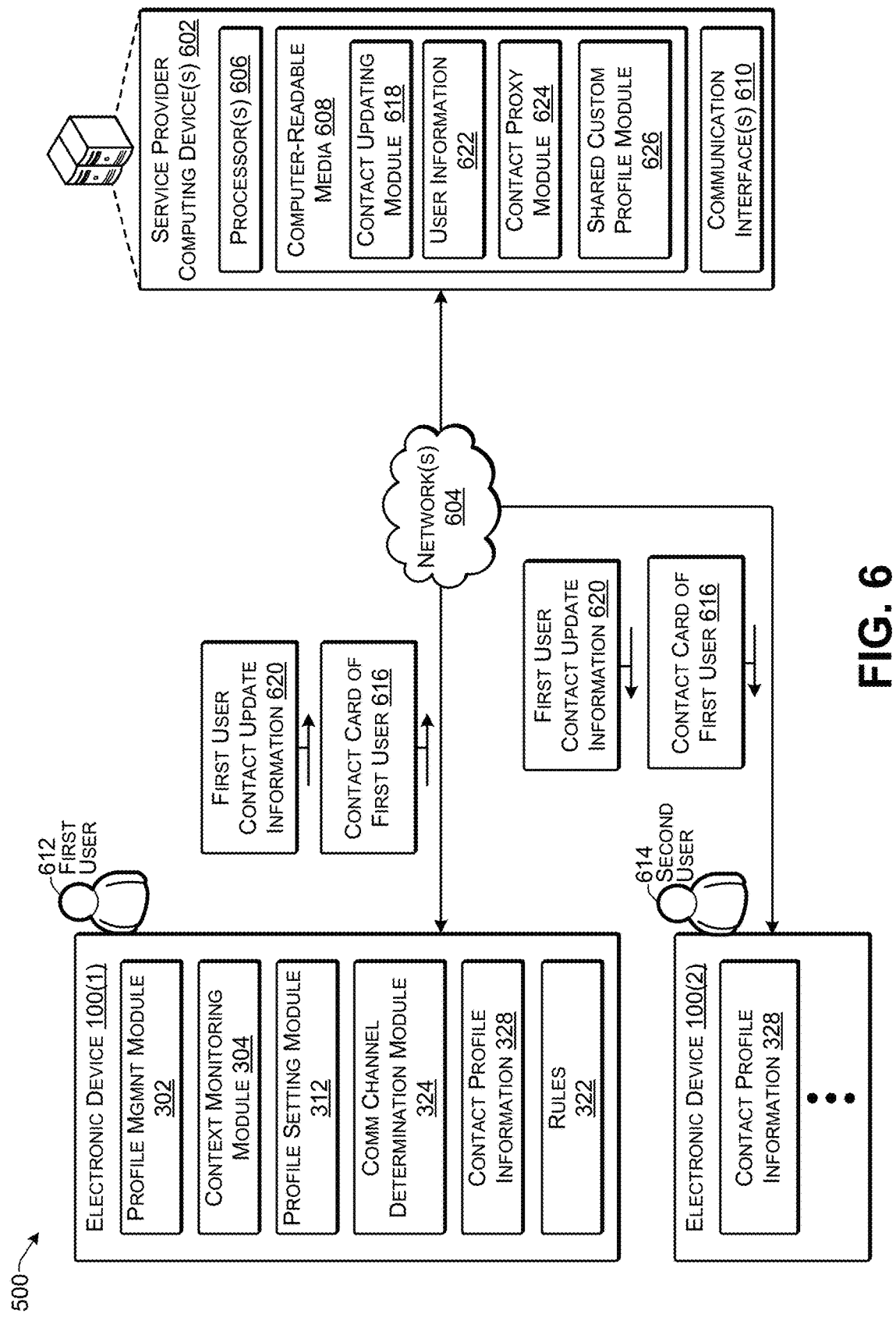
FIG. 6 illustrates an example system for contact information management according to some implementations.

FIG. 6 illustrates an example system 600 to enable management of contact information according to some implementations. For example, one or more service provider computing device(s) 602 may be provided by a service provider, such as an entity that provides a contact management service to a plurality of the electronic devices 100. In this example, the electronic devices 100 may be able to communicate with the computing device 602 through one or more networks 604. For example, the network(s) 604 may include a local area network (LAN), a wide area network (WAN), such as the Internet, or any combination thereof, and may include both wired and wireless communication technologies, including cellular communication technologies. The computing device 602 and the electronic device 100 may communicate and interact with one another using any combination of suitable communication and networking protocols, such as Internet protocol (IP), transmission control protocol (TCP), hypertext transfer protocol (HTTP), cellular communication protocols, and so forth.

In the illustrated example, each computing device 602 may include one or more processors 606, one or more computer readable media 608 and one or more communication interfaces 610. Each processor 606 may be a single processing unit or a number of processing units, and may include single or multiple computing units or multiple processing cores. The processor 606 can be implemented as one or more microprocessors, microcomputers, microcontrollers, digital signal processors, central processing units, state machines, logic circuitries, and/or any devices that manipulate signals based on operational instructions. For instance, the processor 606 may be one or more hardware processors and/or logic circuits of any suitable type specifically programmed or configured to execute the algorithms and processes described herein. The processor 606 can be configured to fetch and execute computer-readable instructions stored in the computer-readable media 608 or other computer-readable media.

The computer-readable media 608 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 602, the computer-readable media 608 may be a type of computer-readable storage media and/or may be a tangible non-transitory media.

The communication interface(s) 610 may include one or more interfaces and hardware components for enabling communication with various other devices, such as the electronic device 100, over the network(s) 604. For example, communication interface(s) 610 may facilitate communication through one or more of the Internet, cable networks, cellular networks, wireless networks (e.g., Wi-Fi, cellular) and wired networks. Protocols and components for communicating via such networks are well known and will not be discussed herein in detail.

During initial exchange of contact information, when a first user 612 of a first electronic device 100(1) gives contact information to a second user 614 of a second electronic device 100(2), the first user can send contact information, such as an electronic contact card 616, for a single communication service, an entire profile of services (e.g., just work contact information or just personal contact information), or all contact information (i.e., contact information for multiple profiles, with identification of which services correspond to the different profiles, e.g., work, personal or custom). In sending the contact information to the second user 614 (e.g., through any communication channel), the communication channel profile information for each listed communication channel may be sent as well to assist the electronic device 100(2) of the second user 114 in correctly placing the first user's contact information into the second user's device 100(2). As one example, if the first user's electronic device 100(1) is in personal profile mode when the contact information is sent, then only the communication channel information associated with the personal profile is provided by default to the second user, and if the first user's electronic device 100(1) is in work profile mode, then only the communication channel information for the work profile is provided by default to the second user 614. This default functionality may be overridden manually by the user. As another example, each communication channel listed in the contact information may be tagged by the first user according to the profile with which it should be associated. The second user's device 100(2) may automatically categorize the various communication channels with the corresponding profile(s) based on the tags. As still another example, if the first user is identified as being associated with a particular profile, all of the first user's communication channels may be associated with the particular profile.

Further, the contact card 616 provided by the first user 612 may include information for multiple communication channels, and may indicate a first preferred communication channel, a second preferred communication channel if the first is unavailable, and so forth. As one example, the order in which the communication channels are listed in the contact card 616 may establish the preferred priority of communication channels. In addition, if both work related communication channels and personal communication channels are provided, the contact card 116 may identify which communication channels are work-profile related and which communication channels are personal-profile related, such as by tagging, labeling, or otherwise associating each listed communication channel with a particular profile.

When the electronic device 100(2) of the second user 614 receives the contact card 116 of the first user, the electronic device 100(2) may automatically categorize and store the listed communication channels according to work profile, personal profile, or custom profile, as appropriate, so that the second user does not have to manually enter this information, does not have to manually create different contact groups, and so forth. For example, suppose that the first user 612 has contact information that includes a work email as a work communication channel and a social network page as a personal communication channel, and the first user 612 sends the contact card 616 with both the work email and the social network page to the electronic device 100(2) of the second user 614. The electronic device 100(2) of the second user 614 may associate the work email with a work profile of the second user 614 and may associate the social network page with a personal profile of the second user 614. Accordingly, the contact information for the first user 612 is included in both the work profile of the second user 614 and the personal profile of the second user 614, but the different specified communication channels help maintain work related communications separate from personal communications. Consequently, the predefined default profile roles (e.g., personal and work) can be used to manage each communication service for directing communications through the proper communication channel for a current context. Further, the contact card 116 may provide additional preference information with respect to certain communication channels, such as "do not telephone between 10:00 pm and 7:00 am," "text messaging is preferred during this time," and so forth, which may be applied by the electronic device 100(2) of the second user when determining an appropriate contact channel to use in a particular context.

In addition, the contact card 616 provided by the first user 612 may include information for enabling the second user 614 to automatically receive updates to the first user's contact information. For example, the service provider computing device 602 may include a contact updating module 618. When the first user 612 changes or updates his or her contact information, the first user may send contact update information 620 to the service provider computing device 602, which may store the contact update information 620 with user information 622. Subsequently, the contact updating module 618 may provide the first user's contact update information 620 to the electronic device 100(2) of the second user 614 and any other users to which the first user 612 provided the contact card 616. As one example, the contact card 616 may identify a network location of the service provider computing device 602, and the electronic device 100(2) may user this information to contact the service provider computing device 602 to obtain the first user's contact update information 620. For example, the second user's electronic device 100(2) may perform a check for updates periodically, upon use of the contact information, or the like. As another example, when the first user 612 provides the contact card 616 to the second user 614, such as via email (or other communication channel), the second user's email address may be stored by the contact updating module 618, and this email address (or other communication channel) may be used to provide the contact update information 620 to the second user's electronic device 100(2). As still another example, the second user 614 may periodically manually manage the contact information on the electronic device 100(2) such as by accessing the contact updating module 618 via a web browser on the electronic device 100(2).

Further, in some examples, the contact card 616 may be provided based on one or more conditions agreed to by the second user 614. This may enable the contact information of the first user 612 to be automatically deleted from the second user's electronic device 100(2) if the first user 612 decides to revoke the contact card 616.

In addition, the service provider computing device 602 may include a contact proxy module 624 for enabling proxied contact information to be provided to certain individuals. For example, suppose that the first user 612 does not want to give his or her phone number or full contact card to the second user 614, but wants the second user 614 to be able to call, text or use some other specified communication channel. The first user 612 may provide proxied contact information to the second user 614 that enables the first user 612 to revoke the contact information later, without ever having shared the first user's actual contact information. This could also apply to text chat, voice chat, video chat, social network information, etc. For example, the contact proxy module 624 may maintain the actual contact information for the first user 612, and may act as the proxy for passing communications between the second user 614 and the first user 612.

Some examples may enable shared custom profiles for various activities, interests, security enforcement, or the like, and these custom profiles may be cloud synchronized with a shared custom profile module 626 on the service provider computing device 602. As one example, a user can create a custom profile such as "Running Club" and can invite other users to join and share that profile. All people who join this shared profile may have the contact information that they want to use for that profile auto-synchronized with everyone else sharing the custom profile. For instance, the person that creates the shared custom profile may be the owner, and the owner may control the addition and removal of other individuals. Removal of a particular user from the shared profile may remove all contact information for the shared profile from the electronic device of the particular user. Further, ownership can be transferrable. As one example, a shared profile may be associated with a voice service to enable creation of a push-to-talk-over-IP service for the group of users that share the profile.

As another example, a shared custom profile may enforce security measures, such as by requiring all participants in the custom profile to encrypt data related to the profile, use encrypted communication channels, or the like. For instance, the custom profile may require the use of a lock screen and entry of a passcode or other authorization information for accessing the custom profile. Further, the communication channels associated with the custom profile may require the use of public/private key pairs, virtual private networks, or other secure communication technologies. Numerous other variations will be apparent to those of skill in the art having the benefit of the disclosure herein.

Figure 7:
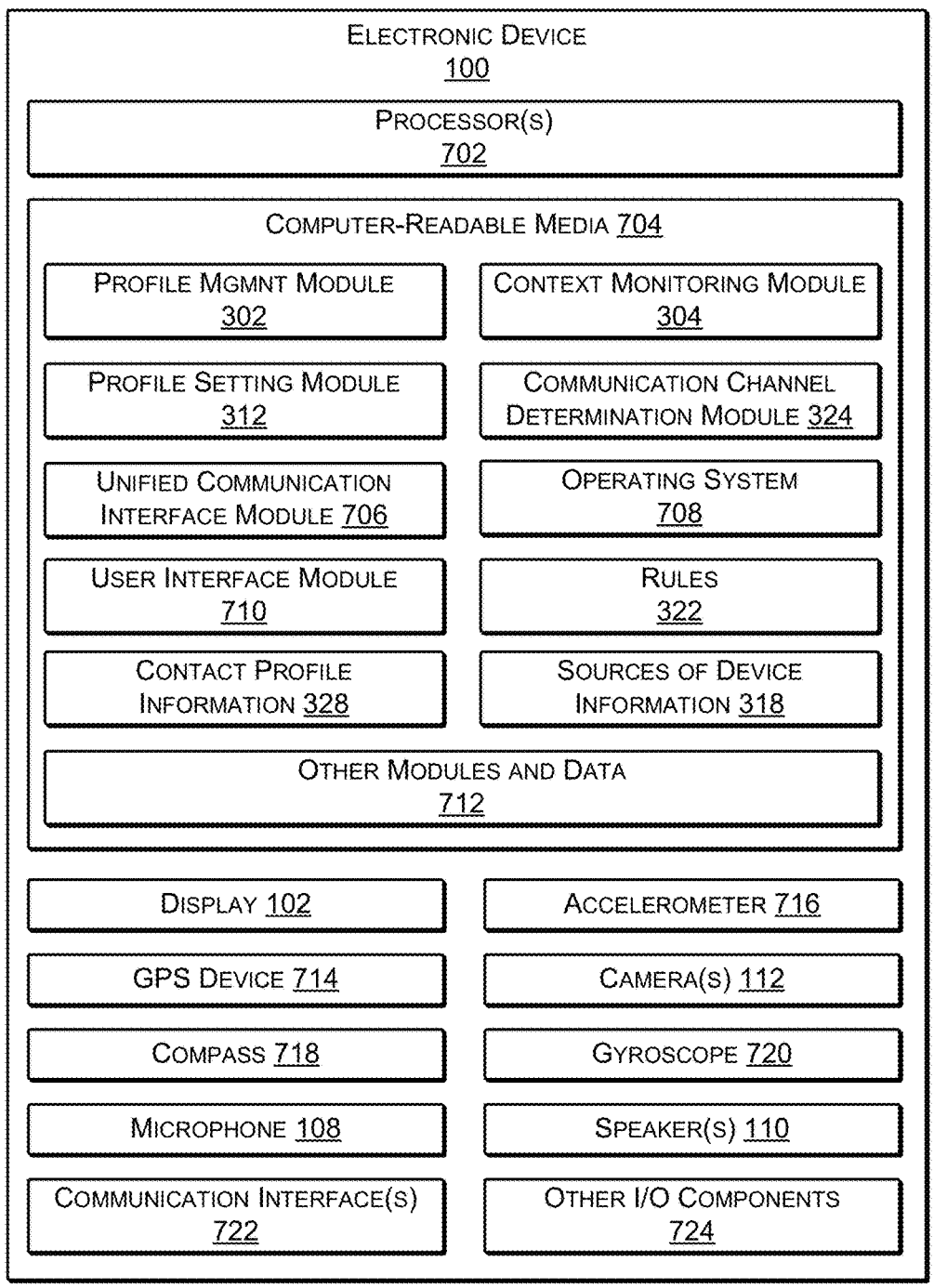
FIG. 7 illustrates select components of an example electronic device according to some implementations.

FIG. 7 illustrates select example components of the electronic device 100 that may be used to implement the functionality described above according to some implementations. In a very basic configuration, the electronic device 100 includes, or accesses, components such as at least one control logic circuit, central processing unit, or processor 702 and one or more computer-readable media 704. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some cases, the processor 702 may be one or more hardware processors and/or logic circuits of any suitable type specifically programmed or configured to execute the algorithms and processes described herein. The processor 702 can be configured to fetch and execute computer-readable instructions stored in the computer-readable media 704 or other computer-readable media.

Depending on the configuration of the electronic device 100, the computer-readable media 704 may be an example of tangible non-transitory computer storage media and may include volatile and nonvolatile memory and/or removable and non-removable media implemented in any type of technology for storage of information such as computer-readable instructions, data structures, program modules or other data. The computer-readable media 704 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the electronic device 100 may access external storage, such as RAID storage systems, storage arrays, network attached storage, storage area networks, cloud storage, or any other medium that can be used to store information and that can be accessed by the processor 702 directly or through another computing device or network. Accordingly, the computer-readable media 704 may be computer storage media able to store instructions, modules or components that may be executed by the processor 702.

The computer-readable media 704 may be used to store and maintain any number of functional components that are executable by the processor 702. In some implementations, these functional components comprise instructions or programs that are executable by the processor 702 and that, when executed, implement operational logic for performing the actions attributed above to the electronic device 100. Functional components of the electronic device 100 stored in the computer-readable media 704 may include the profile management module 302, the context monitoring module 304, the profile setting module 312, and the communication channel determination module 324, as discussed above. Additional functional components stored in the computer-readable media 704 may include a unified communication interface module 706, which may be executed by the processor 702 for generating and controlling the unified communication interface 500 discussed above with respect to FIG. 5. Other functional components may include an operating system 708 and a user interface module 710 for controlling and managing various functions of the electronic device 100, for generating one or more user interfaces, and for providing basic functionality. Any or all of the modules 302, 304, 312, 324, 706 and 710 may be integrated into the operating system 708, or may be operable separately therefrom.

In addition, the computer-readable media 704 may also store data, data structures and the like, that are used by the functional components. For example, data stored by the computer-readable media 704 may include the rules 322, the contact profile information 328, and the sources of device information 318, as discussed above. Depending on the type of the electronic device 100, the computer-readable media 704 may also optionally include other functional components and data, such as other modules and data 712, which may include applications, programs, drivers and so forth, and the data used by the functional components. Further, the electronic device 100 may include many other logical, programmatic and physical components, of which those described are merely examples that are related to the discussion herein.

Further, while the figures illustrate the functional components and data of the electronic device 100 as being present on the electronic device 100 and executed by the processor 702 on the electronic device 100, it is to be appreciated that these components and/or data may be distributed across different computing devices and locations in any manner.

FIG. 7 further illustrates the display 102, which may be passive, emissive or any other form of display. Other components included in the electronic device 100 may include various types of sensors, which may include a GPS device 714, an accelerometer 716, one or more cameras 112, a compass 718, a gyroscope 720, the microphone 108, and so forth. Numerous other types of sensors may be included on the electronic device 100, with the foregoing being merely several examples for discussion purposes.

The electronic device 100 may further include one or more communication interfaces 722, which may support both wired and wireless connection to various networks, such as cellular networks, radio, Wi-Fi networks, short-range or near-field networks (e.g., Bluetooth®), infrared signals, local area networks, wide area networks, the Internet, and so forth. The communication interfaces 722 may further allow a user to access storage on another device, such as a computing device, a network attached storage device, cloud storage, or the like.

The electronic device 100 may further be equipped with the one or more speakers 110 and various other input/output (I/O) components 724. Such I/O components may include a touchscreen and various user controls (e.g., buttons, a joystick, a keyboard, a keypad, etc.), a haptic or tactile output device, connection ports, and so forth. For example, the operating system 708 of the electronic device 100 may include suitable drivers configured to accept input from a keypad, keyboard, or other user controls and devices included as the I/O components 724. Additionally, the electronic device 100 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 8:
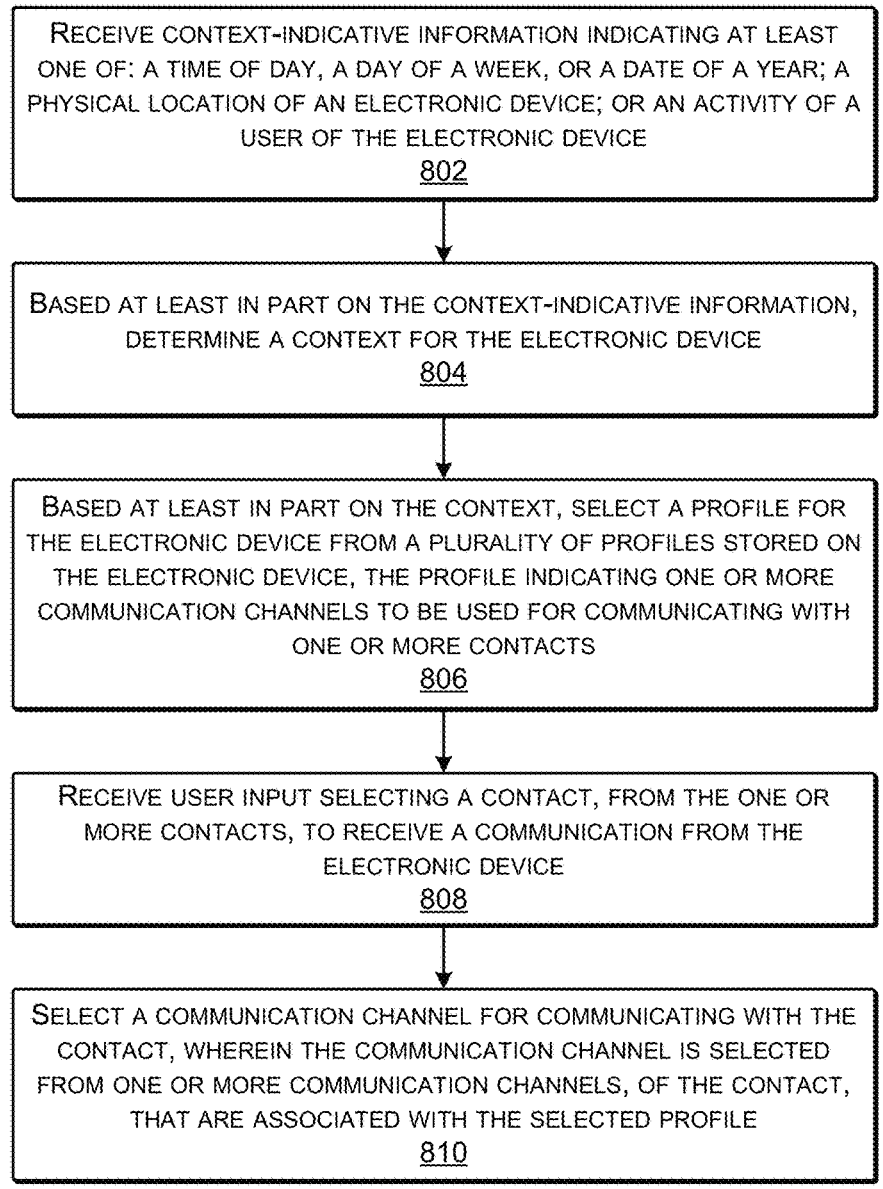
FIG. 8 is a flow diagram illustrating an example process for profile-based communication management according to some implementations.
Figure 9:
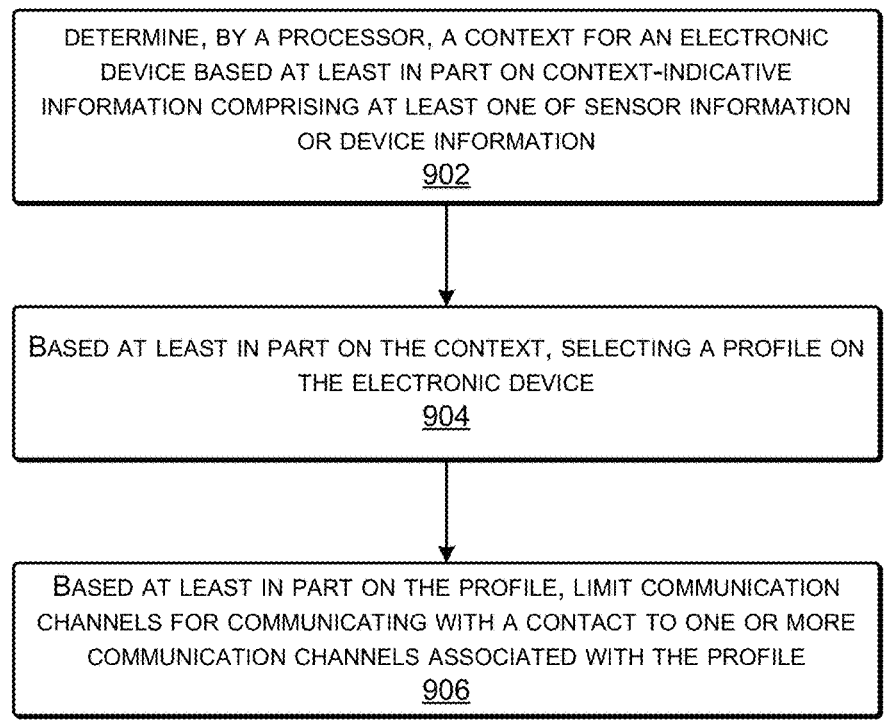
FIG. 9 is a flow diagram illustrating an example process for profile-based communication management according to some implementations.
Figure 10:
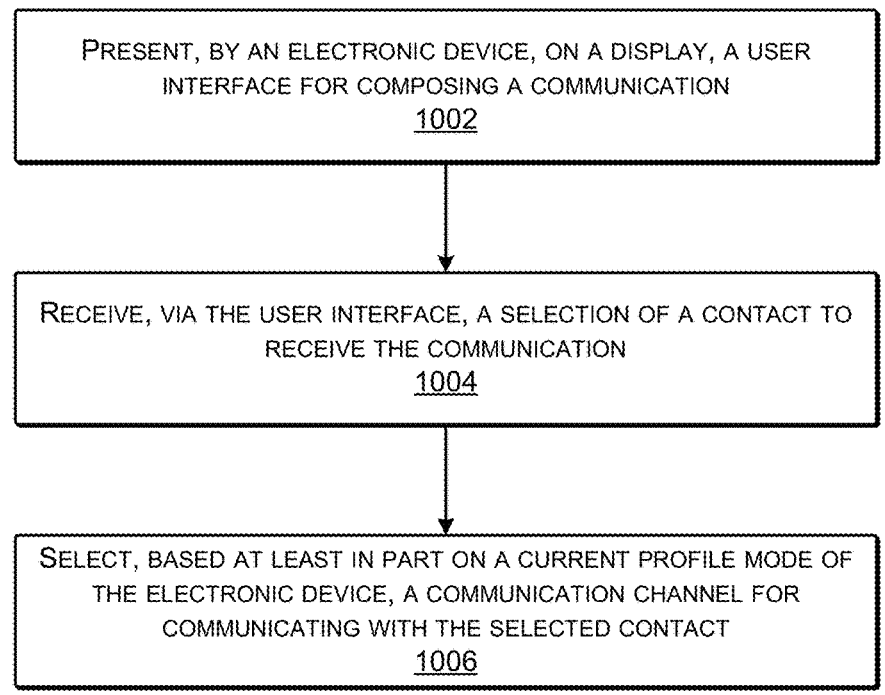
FIG. 10 is a flow diagram illustrating an example process for profile-based communication management according to some implementations.

FIGS. 8-10 illustrate example processes for profile-based management of communications on an electronic device according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

FIG. 8 is a flow diagram illustrating an example process 800 that may be executed, at least in part, by an electronic device according to some implementations.

At 802, the electronic device receives context-indicative information indicating at least one of: a time of day, a day of a week, or a date of a year; a physical location of the electronic device; or an activity of a user of the electronic device. For example, the electronic device may receive a variety of context-indicative information, such as location information or other sensor information, such as from a GPS device, an accelerometer, a compass, a microphone, a communication interface and/or a camera, and which may be used to determine at least one of a time, a location of the electronic device, or an activity of the user of the electronic device. Furthermore, the time information may indicate a time of day, a day of the week, a date of the year, or the like.

At 804, based at least in part on the context-indicative information, the electronic device determines a context for the electronic device. For example, the context may include any of a current physical location of the electronic device, a current time of day, a current day of the week, and/or a current activity of a user of the electronic device.

At 806, based at least in part on the context or the context-indicative information, the electronic device selects a profile for the electronic device from a plurality of profiles stored on the electronic device, the profile indicating one or more communication channels to be used for communicating with one or more contacts. For example, the electronic device may set a role-based profile to be in effect, such as a work-related profile, a personal profile, or a custom profile. Further, the selecting the profile from the plurality of profiles may include using one or more of a statistical model, a classifier, or an algorithm to determine a context from the context-indicative information, and selecting the profile based at least in part on comparing the context with one or more rules for selecting the profile from the plurality of profiles.

At 808, the electronic device receives a selection of a contact to receive a communication from the electronic device. For example, a user may select a contact as a target to receive a communication.

At 810, the electronic device selects a communication channel for communicating with the contact based at least in part on the profile currently set for the electronic device. For example, the communication channel is selected from one or more communication channels, of the contact, that are associated with the selected profile. Thus, if the electronic device is in a work profile, the electronic device may select a communication channel previously associated with the work profile for the contact; if the electronic device is in a personal profile, the electronic device may select a personal communication channel previously associated with the personal profile for the contact. In some cases, the electronic device will select a communication channel that is indicated to be a preferred communication channel based on at least one of past communication activity by the contact or an order of communication channel information provided by the contact when providing contact information.

FIG. 9 is a flow diagram illustrating an example process 900 that may be executed, at least in part, by an electronic device according to some implementations.

At 902, a processor of the electronic device determines a context for the electronic device based at least in part on context-indicative information comprising at least one of sensor information or device information. For example, the context-indicative information may include at least one of an indication of a physical location of the electronic device; a time of day; a day of a week; a date of a year; or an indication of an activity of a user of the electronic device.

At 904, based at least in part on the context, the electronic device selects a profile to be in effect on the electronic device. For example, a processor of the electronic device may set a profile to be in effect based at least in part on a determined context of the electronic device, or in response to receiving a user input.

At 904, based at least in part on the profile in effect, the electronic device limits communication channels for communicating with a contact to one or more communication channels associated with the profile. For example, if the profile in effect is a work profile, the one or more communication channels may be work-related, and if the profile is a personal profile, the one or more communication channels may be personal-related.

FIG. 10 is a flow diagram illustrating an example process 1000 that may be executed by an electronic device according to some implementations.

At 1002, the electronic device presents, on a display, a user interface for composing a communication. For example, the electronic device may present a unified communication interface that may be used to compose messages for a plurality of different types of communication channels.

At 1004, the electronic device receives, via the user interface, a selection of a contact to receive the communication. For example, the user may select one or more contacts to receive a communication.

At 1006, the electronic device selects, based at least in part on a current profile mode of the electronic device, a communication channel for communicating with the selected contact. For example, the electronic device may select a preferred communication channel of the contact for communicating with the selected contact.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An electronic device comprising:
   one or more processors; and
   one or more computer readable media maintaining one or more instructions executable by the one or more processors to perform operations comprising:
   receiving context-indicative information indicating at least one of:
      a time of day, a day of a week, or a date of a year;
      a physical location of the electronic device; or
      an activity of a user of the electronic device;
   determining, using a statistical model, a context from the context-indicative information;
   restricting selection of one or more contacts and one or more communication channels based at least in part on comparing the context with one or more rules for restricting selection of the contacts and the communication channels;
   receiving user input selecting a contact to receive a communication from the electronic device; and
   selecting, based at least in part on the context-indicative information, a communication channel for communicating with the contact.

2. The electronic device as recited in claim 1, wherein the communication channel is a first communication channel, the contact is a first contact, the operations further comprising:
   receiving user input selecting a second contact to receive the communication;
   selecting a second communication channel associated with the second contact for communicating the communication to the second contact based at least in part on a profile, wherein the first communication channel selected for the first contact is a first type of communication channel that is different from a second type of communication channel corresponding to the second communication channel selected for the second contact; and
   sending the communication to the first contact by the first type of communication channel and to the second contact by the second type of communication channel.

3. The electronic device as recited in claim 1, wherein the contact is a first contact, the communication channel is a first communication channel associated with the first contact, the one or more contacts and the one or more communication channels are associated with a first profile, the operations further comprising:
   switching to a second profile; and
   selecting, based at least in part on switching to the second profile, a second communication channel, associated with the first contact, for communicating the communication to the first contact, wherein the second communication channel is different from the first communication channel and is associated with the second profile.

4. The electronic device as recited in claim 1, the operations further comprising
assigning a contact of the one or more contacts an override status, the override status preventing restricting selection of the contact.

5. The device as recited in claim 1, wherein restricting selection of the one or more contacts and the one or more communication channels comprises restricting display, on the electronic device, of available contacts and available communication channels to the one or more contacts and the one or more communication channels.

6. A method comprising:
receiving contact information for a contact, the contact information indicating one or more first communication channels for use with a first profile, and one or more second communication channels for use with a second profile, wherein the contact identifies a person or an entity;
associating the contact with the first profile and the second profile;
determining, by a processor, a type of application executing on an electronic device;
selecting, based at least in part on the type of application executing on the electronic device, the first profile;
limiting a selection by a user of the electronic device to one or more contacts associated with the first profile and limiting communication channels for communicating with the contact to the one or more first communication channels; and
selecting, based at least in part on the type of application executing on the electronic device, a communication channel from the one or more first communication channels for communicating with the contact.

7. The method as recited in claim 6, further comprising:
selecting the second profile on the electronic device; and
limiting, based at least in part on the second profile, the communication channels for the contact to one or more communication channels associated with the second profile.

8. The method as recited in claim 6, wherein the first profile comprises at least one of a personal profile, a work profile, or a custom profile.

9. The method as recited in claim 6, further comprising:
associating the one or more first communication channels with the first profile based on at least one of:
an association of the contact with the first profile; or
an association of the contact with one or more other contacts associated with the first profile.

10. The method as recited in claim 6, further comprising:
automatically categorizing the one or more first communication channels with the first profile based at least in part on at least one of:
an association of the contact with the first profile;
one or more tags associating the one or more first communication channels with the first profile; or
a context determined for a communication received by the electronic device, the communication including the contact information.

11. The method as recited in claim 6, further comprising:
determining that contact information for at least one contact of the one or more contacts is associated with at least two profiles in a plurality of profiles;
associating a first portion of the contact information with the first profile of the at least two profiles; and
associating a second portion of the contact information with the second profile of the at least two profiles.

12. A method comprising:
selecting, by a processor, a profile mode of an electronic device, the profile mode restricting one or more contacts and one or more communication channels based at least in part on a physical location of the electronic device;
presenting, on a display of the electronic device, a user interface for composing a communication;
presenting, on the display, a list of received communications, wherein a first communication in the list is received through a first type of communication channel and a second communication in the list is received through a second type of communication that is different from the first type of communication channel;
receiving, via the user interface, a selection of a contact associated with the profile mode to receive the communication; and
selecting, based at least in part on the profile mode of the electronic device, the first type of communication channel or the second type of communication channel from the list that is associated with the profile mode for sending the communication to the contact.

13. The method as recited in claim 12, wherein the profile mode is one of a work-related profile mode or a personal profile mode.

14. The method as recited in claim 12, further comprising:
switching to a different profile mode based at least in part on a detected change in a context of the electronic device; and
selecting, based at least in part on switching to the different profile, a different communication channel for sending the communication to the contact.

15. The method as recited in claim 12, further comprising omitting from the list a duplicate of the first communication, the duplicate received through the second type of communication channel.

16. The method as recited in claim 12, wherein the profile requires input of security credentials to access the profile when the electronic device is located in a location different from the physical location.

17. The method as recited in claim 12, wherein the physical location is determined from at least one of gyroscopic data or video data.

* * * * *